(12) United States Patent
Zhang et al.

(10) Patent No.: US 8,909,226 B2
(45) Date of Patent: Dec. 9, 2014

(54) HANDOFFS AND HANDOFF SELECTION IN A WIRELESS ACCESS NETWORK

(75) Inventors: Hang Zhang, Nepean (CA); Mo-Han Fong, L'Orignal (CA); Jianglei Ma, Kanata (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 2214 days.

(21) Appl. No.: 11/570,028

(22) PCT Filed: Jun. 3, 2005

(86) PCT No.: PCT/IB2005/001571
§ 371 (c)(1),
(2), (4) Date: Dec. 4, 2006

(87) PCT Pub. No.: WO2005/122622
PCT Pub. Date: Dec. 22, 2005

(65) Prior Publication Data
US 2008/0268844 A1    Oct. 30, 2008

Related U.S. Application Data

(60) Provisional application No. 60/577,205, filed on Jun. 7, 2004, provisional application No. 60/580,906, filed on Jun. 21, 2004, provisional application No. 60/598,225, filed on Aug. 2, 2004.

(51) Int. Cl.
*H04W 36/00* (2009.01)
*H04W 36/30* (2009.01)
*H04W 36/18* (2009.01)

(52) U.S. Cl.
CPC .............. *H04W 36/30* (2013.01); *H04W 36/18* (2013.01)
USPC ........... 455/436; 455/437; 455/438; 455/439; 455/440; 455/441; 455/442; 455/443; 455/444; 370/331; 370/332; 370/333; 370/334

(58) Field of Classification Search
USPC ........................ 455/436–444; 370/331–334
See application file for complete search history.

(56) References Cited

U.S. PATENT DOCUMENTS 6,396,820 B1    5/2002  Dolan et al.
2001/0036830 A1*  11/2001  Wu et al. .................. 455/436

(Continued)

FOREIGN PATENT DOCUMENTS

EP      0920230 A1    6/1999
WO      01/35586 A1   5/2001

(Continued)

OTHER PUBLICATIONS

H. Weng,, A. Prasad: Security Context Transfer in Vertical Handover, 14$^{th}$ IEEE 2003 International Symposium on Personal Indoor and Mobile Radio Communication Proceedings, pp. 2775-2779.*

(Continued)

*Primary Examiner* — Steve D Agosta
(74) *Attorney, Agent, or Firm* — Fay Kaplun & Marcin LLP

(57) ABSTRACT

The present invention facilitates handoffs for a mobile terminal in a wireless access network that is capable of supporting different types of handoffs. The different handoff types may include soft handoffs and fast base station switching (FBSS). In operation, context information associated with supporting wireless communications between the wireless access network and the mobile terminal are determined. Based on whether the context information is shared between base stations involved in the handoff or transferred from one base station to another of the base stations involved in the handoff, a particular handoff type is selected from the different handoff types that are available. Selecting the specific type of handoff to use may also be based on the level of context information that is available, the actual content of the context information, application preferences, channel conditions, base station or mobile terminal capabilities, or any combination thereof.

20 Claims, 19 Drawing Sheets

(56) References Cited

U.S. PATENT DOCUMENTS

| | | | |
|---|---|---|---|
| 2002/0072382 A1* | 6/2002 | Fong et al. | 455/507 |
| 2004/0116146 A1* | 6/2004 | Sadowsky et al. | 455/525 |
| 2004/0219918 A1* | 11/2004 | Kakishima et al. | 455/436 |
| 2005/0070287 A1* | 3/2005 | Cave et al. | 455/436 |
| 2005/0163077 A1* | 7/2005 | Suda | 370/331 |
| 2006/0099952 A1* | 5/2006 | Prehofer | 455/440 |

FOREIGN PATENT DOCUMENTS

| | | | | |
|---|---|---|---|---|
| WO | WO 01/35586 A1 * | 5/2001 | | H04L 12/56 |
| WO | 02/060208 A1 | 8/2002 | | |

OTHER PUBLICATIONS

International Search Report for PCT/IB2005/001571, mailed Oct. 13, 2005.

* cited by examiner

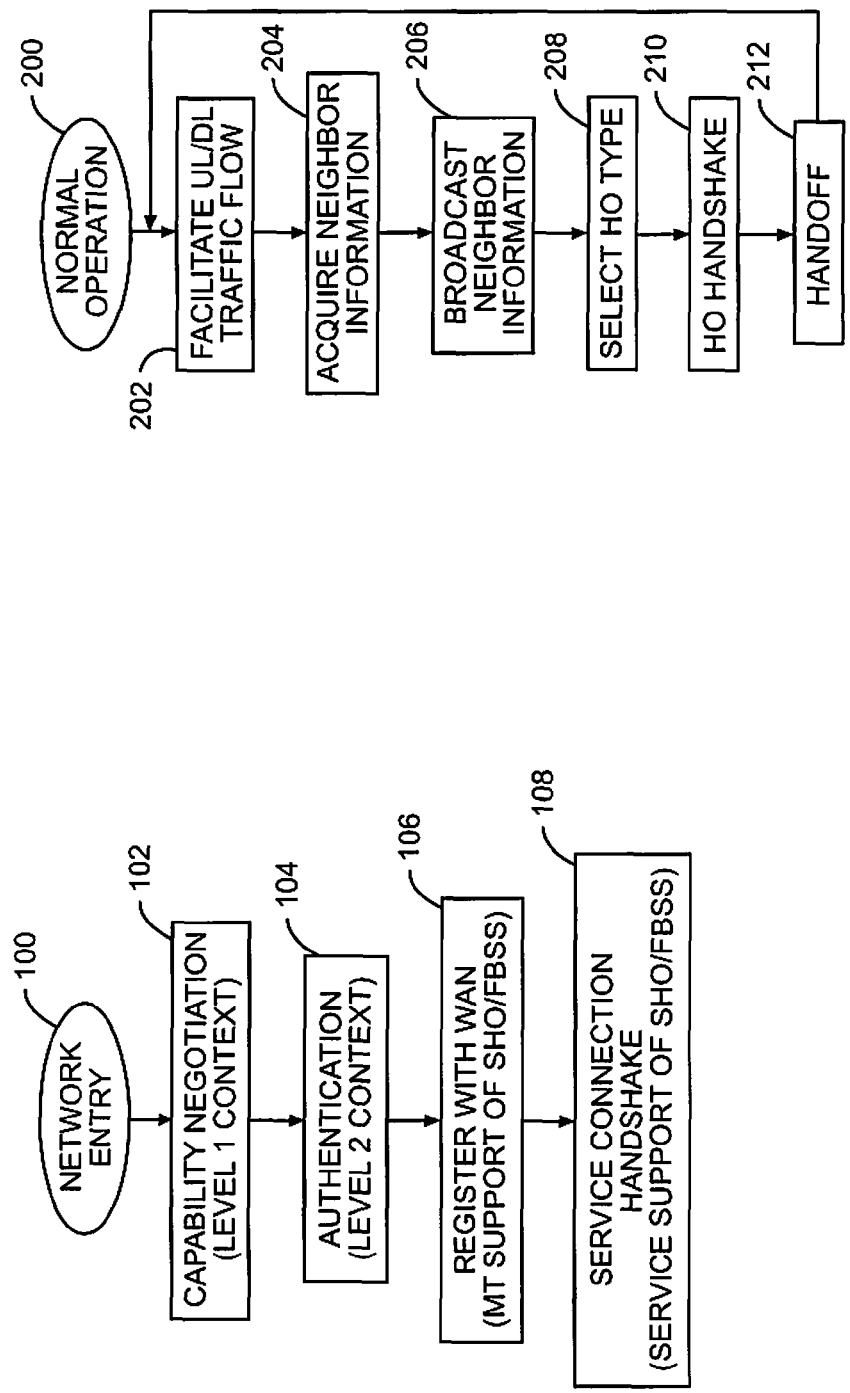

FRAME NUMBER

| BS | 1 | 2 | 3 | 4 | 5 | 6 | 7 | 8 | 9 | 10 |
|---|---|---|---|---|---|---|---|---|---|---|
| 1 | I | J | H | F | G | I | J | H | F | G |
| 2 | O | M | N | K | L | O | M | N | K | L |
| 3 | C | D | E | A | B | C | D | E | A | B |
| 4 | C | D | E | A | ■ | C | D | E | A | ■ |
| 5 | C | D | E | ■ | B | C | D | E | ■ | B |
| 6 | I | J | H | F | ■ | I | J | H | F | ■ |
| 7 | I | J | H | ■ | G | I | J | H | ■ | G |
| 8 | O | M | N | K | ■ | O | M | N | K | ■ |
| 9 | O | M | N | ■ | L | O | M | N | ■ | L |

FIG. 5C

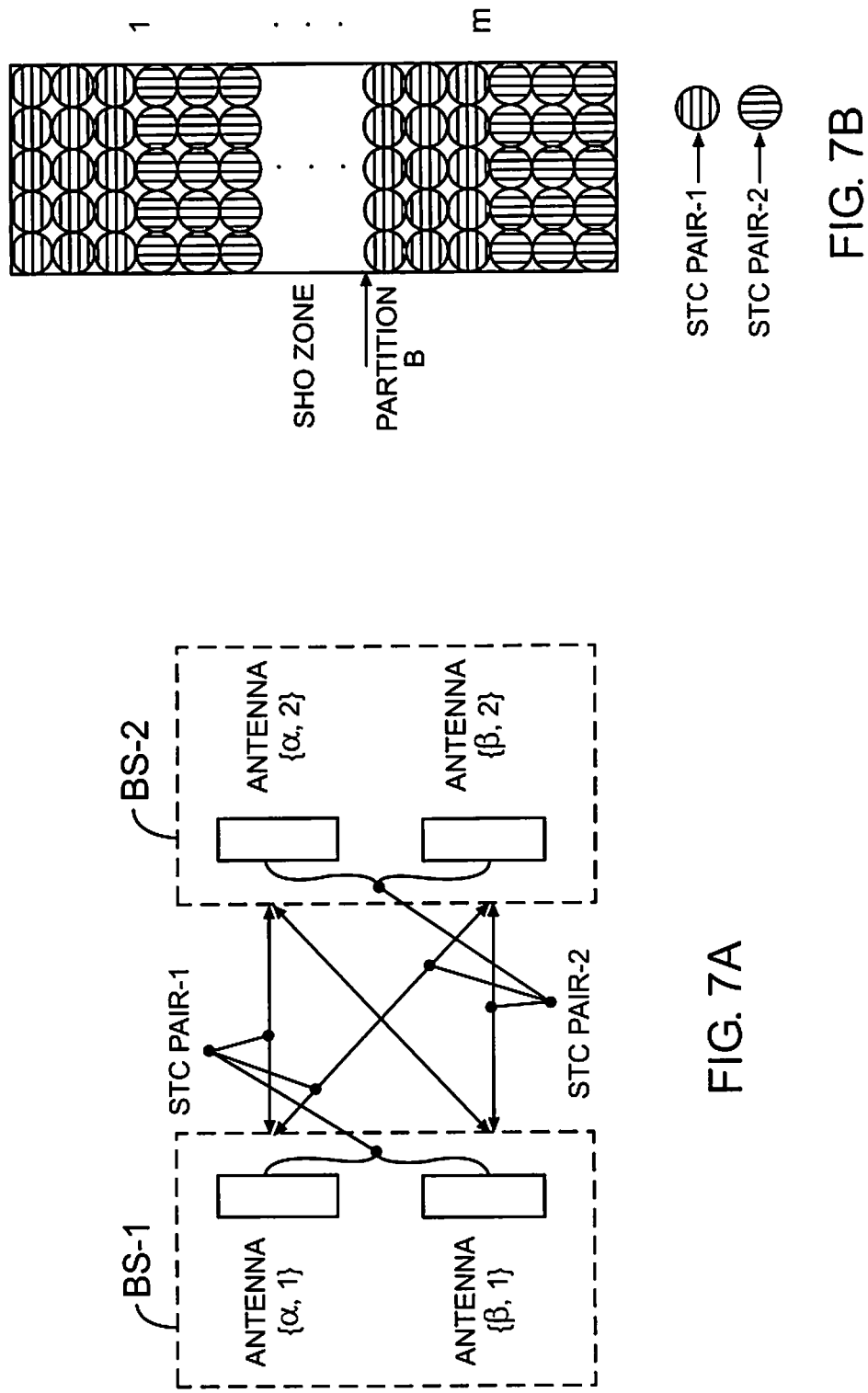

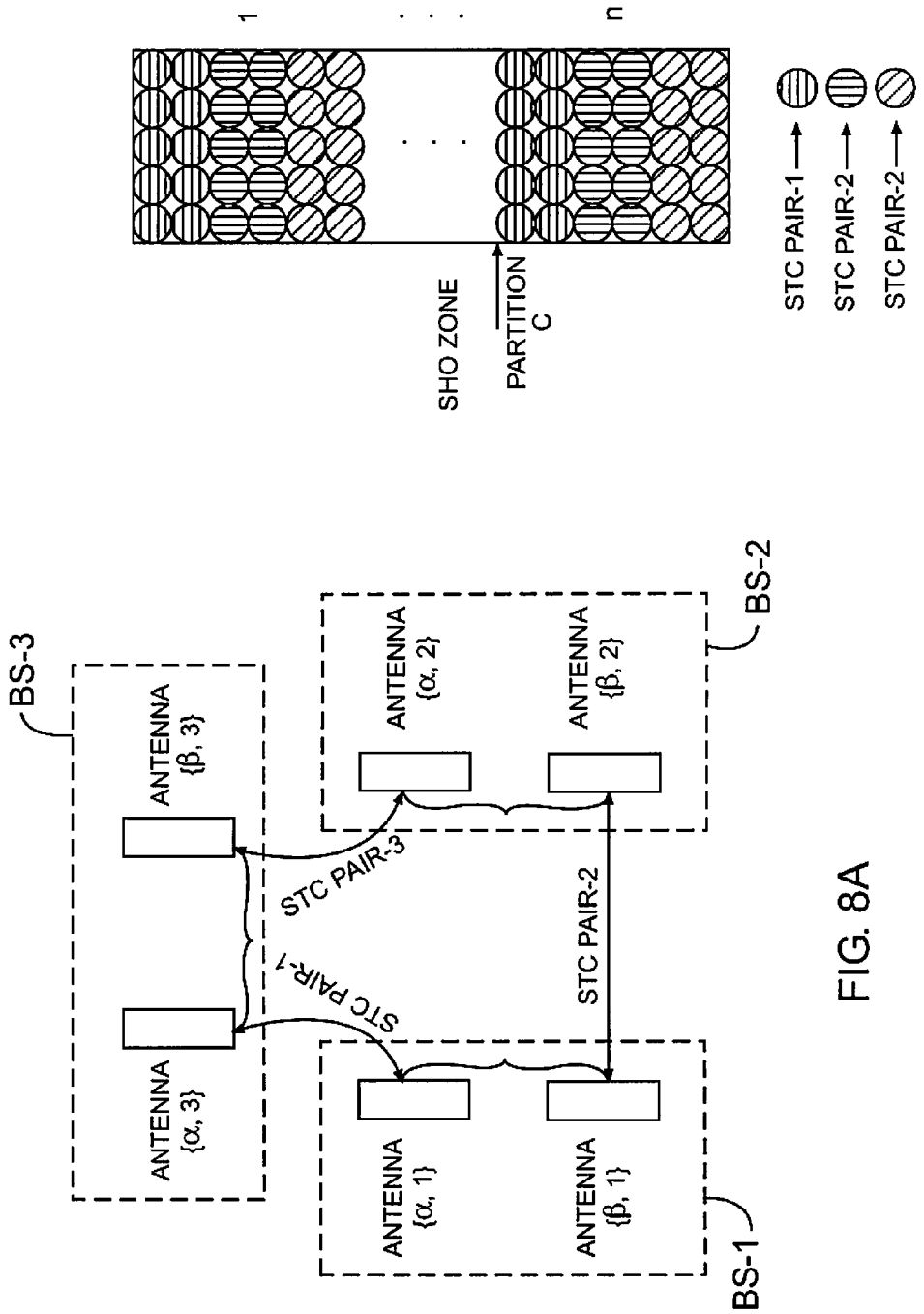

HANDOFFS AND HANDOFF SELECTION IN A WIRELESS ACCESS NETWORK

This application is a National Phase filing based on PCT/IB2005/001571 filed Jun. 3, 2005, which claims the benefit of U.S. provisional application Ser. No. 60/577,205 filed Jun. 7, 2004; U.S. provisional application Ser. No. 60/580,906 filed Jun. 21, 2004, and U.S. provisional application Ser. No. 60/598,225 filed Aug. 2, 2004, the disclosures of which are hereby incorporated by reference in their entireties.

FIELD OF THE INVENTION

The present invention relates to wireless communications, and in particular to various types of handoffs and techniques for selecting an appropriate handoff in a wireless access network.

BACKGROUND OF THE INVENTION

In a wireless access network, numerous base stations are geographically distributed in a cellular arrangement and adapted to communicate with various mobile terminals. The coverage area, or cells, of the adjacent base stations generally overlaps. As a mobile terminal moves within a given cell supported by a base station, or from one cell to another, multiple base stations can support communications with the mobile terminal.

When moving from one cell to another, the wireless access network and the mobile terminal will cooperate to switch communications from one base station to another to support continued service and uninterrupted traffic flow. Such switching is often referred to as a "handoff." When the base stations are switched during a communication session, integrity of the traffic flow must be maintained.

Switching between base stations generally involves soft or hard handoffs. Soft handoffs involve multiple supporting base stations sending redundant data during a transition from one base station to another. Hard handoffs involve a distinct transition from one base station to another. In another scenario, the service may quickly switch back and forth between multiple base stations, based on channel conditions. Such switching is referred to as either fast base station switching (FBSS) or fast cell switching (FCS).

Depending on the access network and the mobile terminal, multiple types of handoffs may be supported. Accordingly, there is a need for an efficient and effective way to select the most appropriate type of handoff to implement in a dynamic fashion. Further, there is a need to improve the efficiency of the various types of handoffs by providing improved techniques for implementing the handoffs.

SUMMARY OF THE INVENTION

The present invention facilitates handoffs for a mobile terminal in a wireless access network that is capable of supporting different types of handoffs. The different handoff types may include soft handoffs and fast base station switching (FBSS). Different types of soft handoffs as well as FBSS, such as macro-diversity soft handoffs and selective handoffs, may be used. Further, the FBSS may include fast cell switching (FCS). In operation, context information associated with supporting wireless communications between the wireless access network and the mobile terminal are determined. Based on whether the context information is shared between base stations involved in the handoff or transferred from one base station to another of the base stations involved in the handoff, a particular handoff type is selected from the different handoff types that are available. Selecting the specific type of handoff to use may also be based on the level of context information that is available, the actual content of the context information, application preferences, channel conditions, base station or mobile terminal capabilities, or any combination thereof. When certain levels of context information are not available or the mobile terminal or base station lacks sufficient capabilities to support a particular type of handoff, hard handoffs may be available, depending on the configuration of the wireless access network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B are flow diagrams illustrating network entry in normal operation according to one embodiment of the present invention.

FIGS. 5A-5C illustrate how an active set of base stations is allocated in a macro-diversity soft handoff embodiment of the present invention.

FIGS. 7A and 7B illustrate antenna assignment in a corresponding soft handoff zone construction according to a first embodiment of the present invention.

FIGS. 8A and 8B illustrate antenna assignment in a corresponding soft handoff zone construction according to a second embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
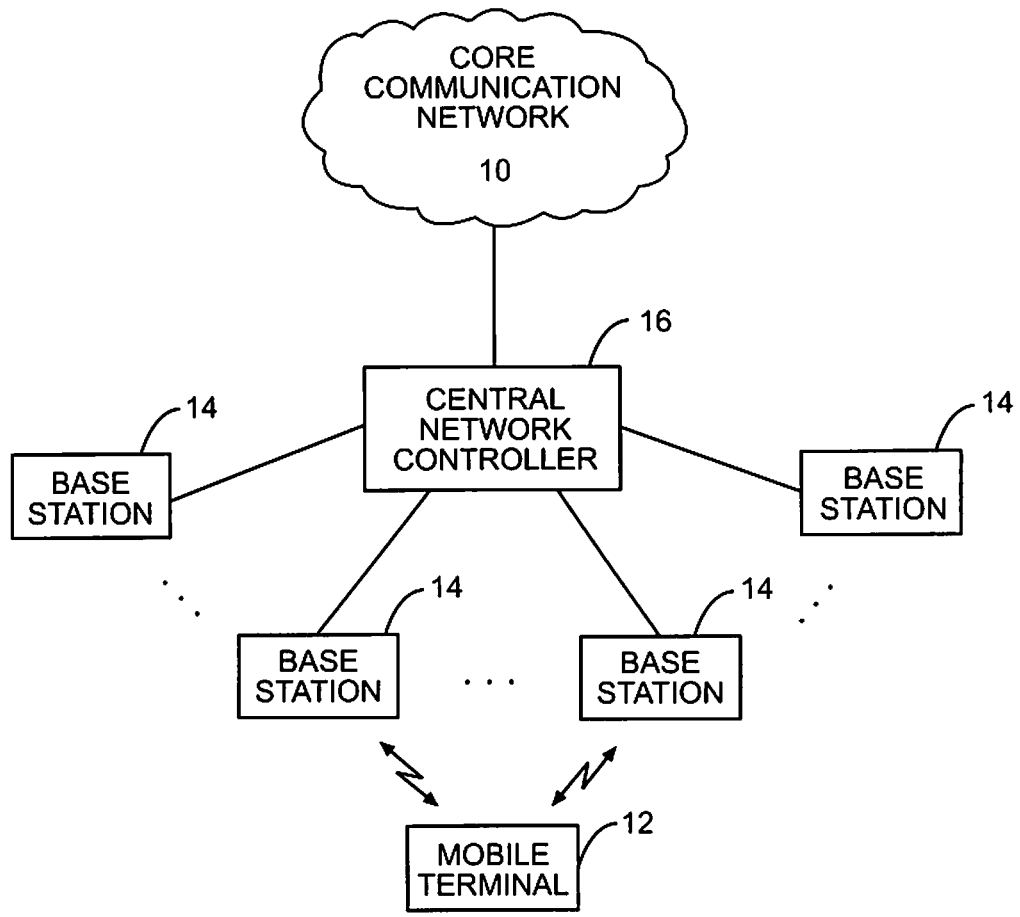
FIG. 1 is a communication environment according to one embodiment of the present invention.

With reference to FIG. 1, a core communication network 10 is associated with a wireless access network (WAN) to facilitate communications with a mobile terminal 12. The WAN includes a number of geographically distributed base stations 14, which may be associated with a central network controller 16. The central network controller 16 is a logical entity, which may be implemented in various nodes or distributed among multiple nodes within the WAN. In particular, the central network controller 16 may reside in or be distributed among base stations 14, base station controllers, edge routers, digital subscriber line access modems (DSLAMs), or located in one or more nodes in the core communication network 10. Logical implementation of a central network controller 16 may also be referred to as a dynamic mobility control point. When distributed, the location of the central network controller 16 may change from one location to another depending on the movement of a particular mobile terminal 12. In one embodiment, each mobile terminal 12 is associated with a central network controller 16. Notably, certain embodiments will not require a central network controller 16. Certain WANs may not use a central network controller 16 and will use a specially configured base station 14, or other type of access point, to interface with a disparate network, such as the core communication network 10. The core communication network 10 may be associated with numerous WANs, and any number of mobile terminals 12 may be within any given WAN.

A base station 14 may be any type of wireless access point for cellular, wireless local area network (WLAN), or other wireless communications. During communications, the mobile terminals 12 may move from being supported by one base station 14 to another, as well as move from one WAN to another. The communication coverage provided by each of the base stations 14 is referred to as a cell and may overlap in whole or in part. As such, the mobile terminal 12 may theoretically be able to communicate with multiple base stations 14 at any given time. The present invention addresses selecting an appropriate type of handoff, implementing the selected type of handoff, and controlling traffic flow to and from the mobile terminal 12 through different base stations 14 as service for the mobile terminal 12 transitions from one base station 14 to another during a selected handoff.

Prior to delving into the details of the present invention, different data units for carrying any type of information, including audio, video, data, and voice, are defined for clarity. In general, a protocol data unit (PDU) is a packetized unit of information exchanged over a radio communication link between the base station 14 and the mobile terminal 12. The PDUs are generally fragmented pieces of higher layer service data units (SDUs) In one embodiment of the present invention, an SDU may correspond to an Internet Protocol (IP) packet or Ethernet frame. In the WAN, the processing used to convert SDUs into PDUs for downlink communications and PDUs into SDUs for uplink communications may take place at the base stations 14, the central network controller 16, or a combination thereof. The mobile terminal 12 will also need to generate SDUs from PDUs during downlink communications and create PDUs from SDUs during uplink communications. For the wireless link, a PDU is exchanged between the media access control (MAC) entities in the mobile terminal 12 and the base station 14.

In one embodiment, at least three types of handoffs are potentially available for use as a mobile terminal 12 moves within a cell or from one cell to another. For illustrative purposes only, assume there are three possible handoffs: hard handoffs (HHOs), soft handoffs (SHOs), and fast base station switching (FBSS). The WAN, which may represent one or more base stations 14, the central network controller 16, or a combination thereof, will interact with the mobile terminal 12 to allow either the WAN or the mobile terminal 12 to select one of the available handoff types based on context information, and perhaps based on whether the context information is shared among the base stations 14 involved in the handoff or transferred from one base station 14 involved in the handoff to another. The context information generally relates to device, hardware, software, or mobile and network capabilities, which bear on the availability, desire, or need for a particular type of handoff.

As an example, the context information may be broken into four different levels, level 1 through level 4. Notably, context information for each level may include all lower levels. For example, level 3 context information may include level 1 and level 2 context information. Level 1 context information may related to hardware or software capabilities of a mobile terminal 12 or supporting based stations 14, and may relate to coding rates, types of encoding, physical layer requirements, and the like. If the hardware and software are configurable, the mobile terminal 12 and the base stations 14 involved in the handoff can negotiate and exchange various parameters. Level 2 context information may relate to network access and authentication criteria relating to security and permission requirements. The level 2 context information may include identification information, encryption or decryption keys, passwords, or the like, and may be provided or exchanged during an authentication process. Level 3 context information may relate to the particular service or services supported by the WAN, particular base stations 14, and the mobile terminal 12. The service information may identify whether audio, video, data, or voice applications are being supported, and whether the information is being streamed, along with any other service related information. The service related information may include service flow identification and quality of service information. Level 4 context information may relate to where and how traffic is controlled in the WAN, and in particular may provide fragmentation control of SDU to PDU conversions, management of active and inactive states, and the ability to maintain continuity of PDU flows.

For level 3 or level 4 context information, a logical or actual central network controller 16 may be implemented to provide centralized control of the various base stations 14 involved in any particular handoff. In such an embodiment, the context information may be shared with multiple base stations 14 at the same time during a handoff. Alternatively, in an embodiment with a central network controller 16 or one without, information may be transferred between base stations 14 during a handoff. In general, the transferring base station 14 will completely transfer the context information to another base station 14 to which the mobile terminal 12 is being handed off. The base station 14 handing off service of the mobile terminal 12 will not further use the transferred context information. However, the context information may be kept for a certain period of time for future use.

As an example, in configurations where only level 1 or 2 context information is shared or transferred, only a hard handoff is available. In configurations where level 3 or level 4 context information is transferred or shared, the selection of a soft handoff or fast base station switching may depend on the context information itself or whether the context information is being transferred or shared. If the level 3 or 4 context information is transferred, fast base station switching is selected. If the level 3 or level 4 context information is shared, a soft handoff or fast base station switching is available, and the selection between a soft handoff or fast base station switching is based on the actual context information, which may be a desire or requirement of an application associated with a session to be supported, channel conditions, resource availability, or loads on the respective base stations 14 involved in the handoff.

The decision to switch between base stations 14 may be based on one or more criteria in addition to the context information. The criteria may include channel quality information from one or more base stations 14, mobile movement or velocity, the amount of data to be transmitted in the uplink or downlink direction, the existing loads at the various base stations 14, service and traffic flow requirements such as quality of service, delay, packet loss, and transfer rate, as well as service type. Those skilled in the art will recognize other criteria that may alone or in combination be used to make decisions regarding control switching.

Depending on the configuration of the WAN and the mobile terminal 12, the context information may be provided to or exchanged between various entities in different ways and at different times. With reference to FIG. 2A, an exemplary process for allowing a mobile terminal 12 to gain access to the WAN is provided. At network entry (step 100), capability information, including level 1 context information, is negotiated or exchanged between the WAN and the mobile terminal 12 (step 102). Next, an authentication process is provided wherein level 2 context information is provided or exchanged between the WAN and the mobile terminal 12 (step 104). Once authentication is complete, the mobile terminal 12 will register with the WAN (step 106), wherein the mobile terminal 12 may indicate that it can support soft handoffs or fast base station switching. Next, negotiation or handshaking for establishing a service connection is provided (step 108), wherein the mobile terminal 12 may identify the services for which soft handoffs or fast base station switching is available. At this point, one can assume that at least level 3 context information is provided. Further, the exchanges between the WAN, the base station 14, and the mobile terminal 12 may indicate whether transfer or sharing of context information is supported.

With reference to FIG. 2B, normal operation (step 200) of the mobile terminal 12 facilitates uplink or downlink traffic flows for one or more communication sessions (step 202). The currently serving base station 14 may acquire information from the neighboring base stations 14 (step 204) and broadcast the information received from the neighboring base stations 14 to the supported mobile terminals 12 (step 206). The mobile terminal 12, the base station 14, or a cooperation therebetween, will result in selecting a particular type of handoff from a number of available types of handoffs (step 208) and initiate a handoff handshake (step 210) to effect a handoff of the selected type (step 212), wherein the process repeats. Again, the selection of a handoff type may be based on the actual context information, the level of available context information, or whether the context information is shared or transferred between base stations 14 involved in the handoff.

Figure 3A:
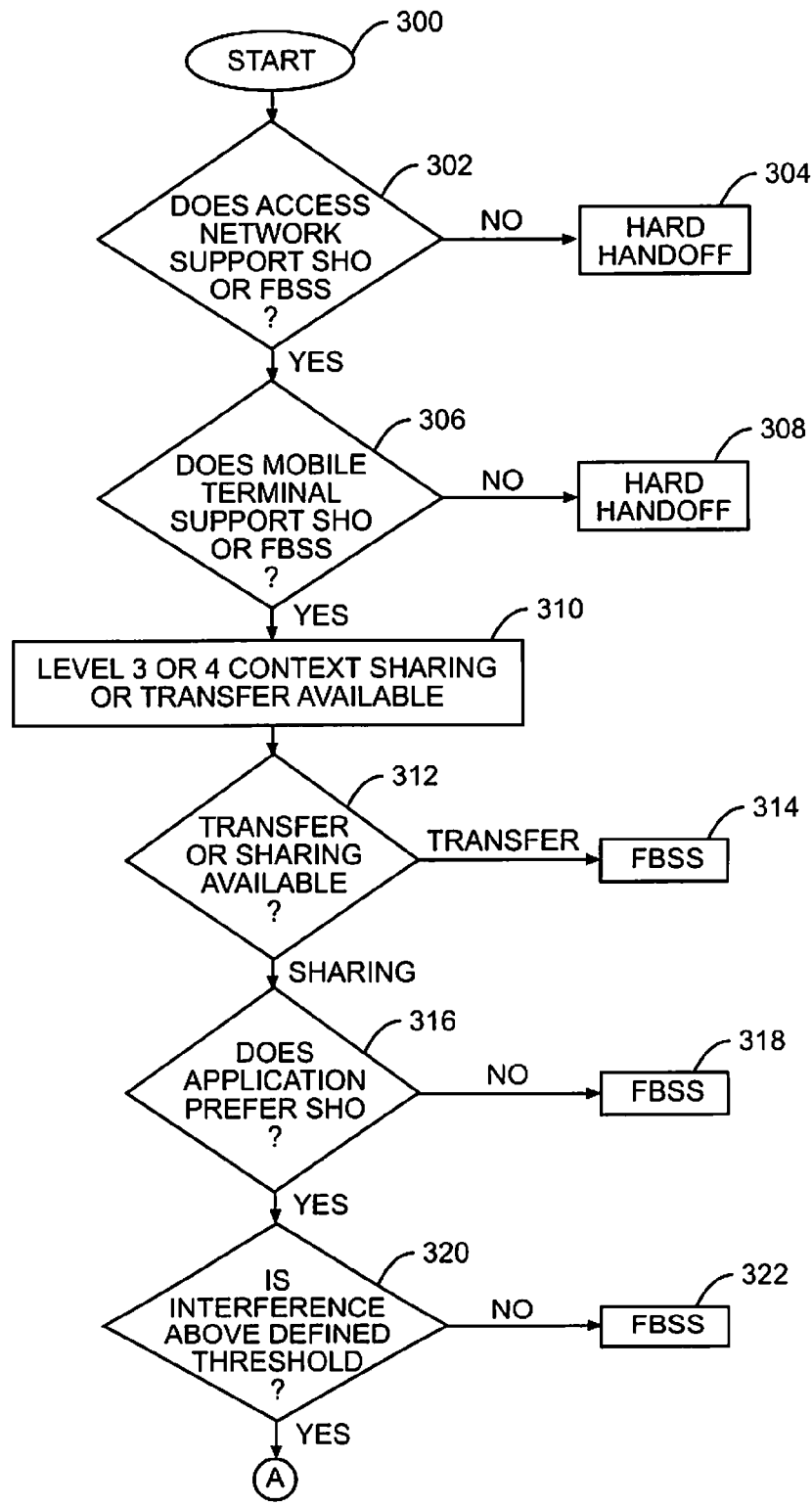
FIGS. 3A and 3B are a flow diagram illustrating the basic process for selecting a type of handoff according to one embodiment of the present invention.
Figure 3B:
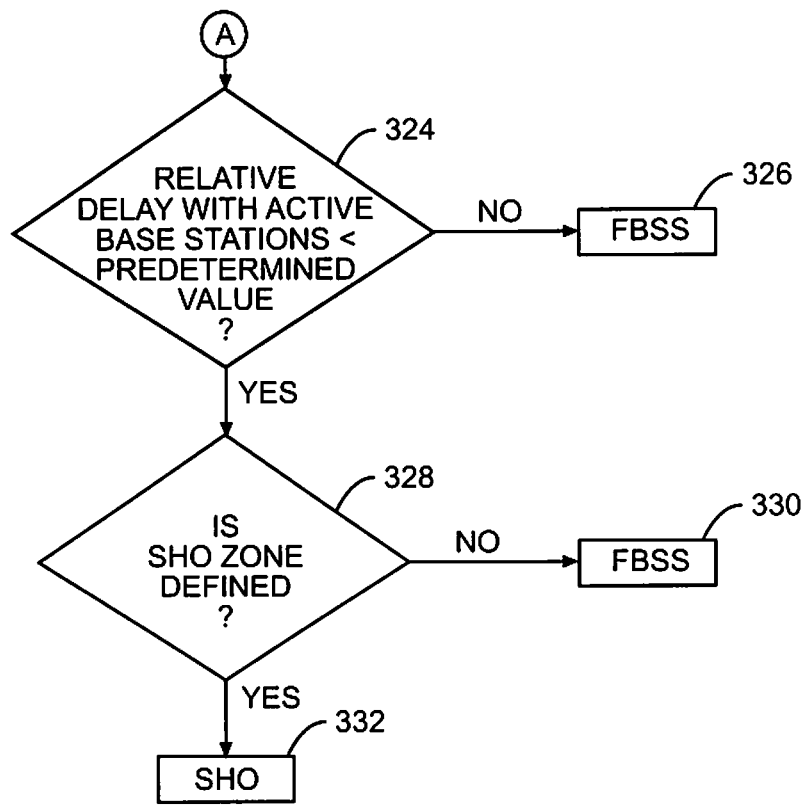

An exemplary handoff selection flow is provided in FIGS. 3A and 3B. Notably, the illustrated process may be implemented in whole or in part in a localized or distributed fashion between the WAN and the mobile terminal 12. The process begins (step 300) by determining whether the WAN supports soft handoffs or fast base station switching (step 302). If neither is supported, a hard handoff is used (step 304). If the WAN supports soft handoff and/or fast base station switching, a determination is made of whether the mobile terminal 12 can support soft handoffs or fast base station switching (step 306). If the mobile terminal 12 does not support either one, a hard handoff is used (step 308). If the mobile terminal 12 supports soft handoff and/or fast base station switching, and assuming level 3 or level 4 context information is available and sharing or transferring of that information is possible (step 310), a determination is made as to whether the context information will be transferred or shared during the handoff (step 312). If the context information is to be transferred, fast base station switching is selected (step 314). If the context information is to be shared, a determination is made as to whether the application for the communication session prefers a soft handoff, which is inherently a more robust handoff technique (step 316). If the application does not necessarily prefer a soft handoff, fast base station switching is used (step 318). If the application prefers a soft handoff, the interference associated with the communication channel may be used to determine whether a soft handoff or fast base station switching is used (step 320).

If channel quality is in a certain threshold or interference is not above a defined threshold, fast base station switching is used (step 322); otherwise, the relative associated delay with the base stations 14 in the active set of base stations 14 is analyzed (step 324). If the relative delay between any base station pair is not less than a predetermined value, then fast base station switching is used (step 326); otherwise, the decision between soft handoff and fast base station switching is decided based on whether a soft handoff zone is defined (step 328). If a soft handoff zone is not defined, then fast base station switching is used (step 330). If a soft handoff zone is defined, then a soft handoff is used (step 332). Those skilled in the art will recognize alternative decision-making processes for selecting between soft handoffs and fast base station switching, as well as other types of handoffs, in light of the concepts described and exemplified herein.

Figure 4A:
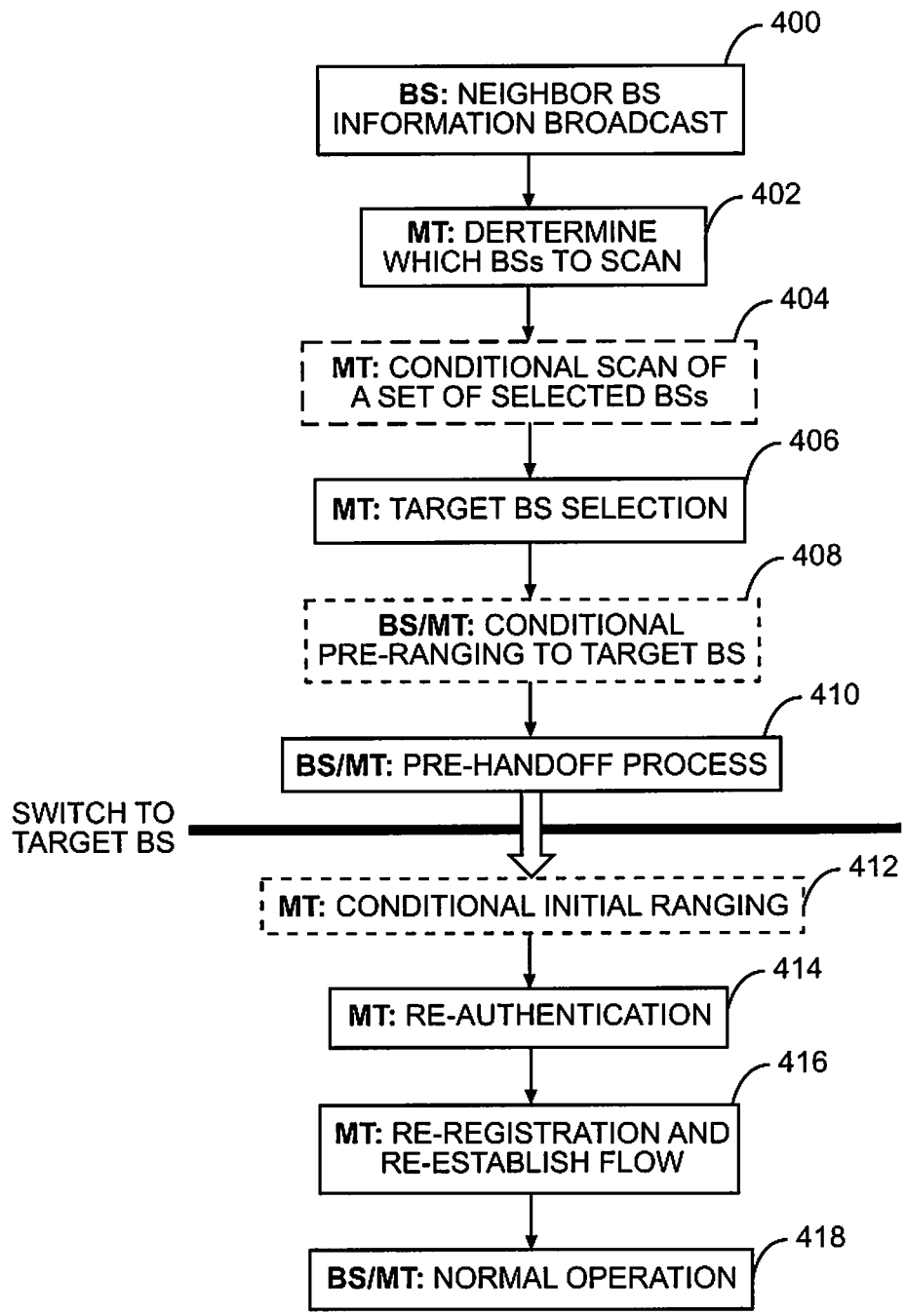
FIGS. 4A-4C are flow diagrams illustrating different hard handoff techniques according to the present invention.

Turning now to FIG. 4A through FIG. 10, various handoff techniques are described. With particular reference to FIG. 4A, a hard handoff scenario is illustrated, wherein no context information is available or only level 1 information is shared or transferred between base stations 14 involved in the handoff. Initially, the serving base station 14 will broadcast information pertaining to neighboring base stations 14 to the mobile terminal 12 (step 400). The information may identify the physical parameters of the neighboring base stations 14, their acceptable carrier-to-interference ratio thresholds, and available or supportable bandwidth. The mobile terminal 12 will determine which of the base stations 14 to scan, or monitor, based on the broadcast information (step 402). The mobile terminal 12 may initiate a conditional scan of a set of selected base stations 14 (step 404). In one embodiment, the mobile terminal 12 will request a scan only if there is no uplink data pending, or the base station 14 will only confirm a scan if there is no downlink data pending. The mobile terminal 12 will then select a target base station 14 to which a handoff is desired (step 406). A base station 14 may be selected as a target base station 14 if the measured carrier-to-interference ratio associated with a target base station 14 is higher than the predefined acceptable carrier-to-interference threshold and the additional supportable bandwidth is sufficient for the communication session or otherwise acceptable by the mobile terminal 12.

Next, the base station 14 and the mobile terminal 12 will initiate conditional pre-ranging to the target base station 14 (step 408). In an effort to minimize the impact on existing sessions, the conditional pre-ranging step may be provided only when there is no data pending in both the downlink and uplink traffic flows, and no immediate handoff is needed. When pre-ranging is initiated, the serving base station 14 will inform the target base station 14 that pre-ranging is requested. The target base station 14 will respond with an assigned ranging resource, which may include a temporary handoff identification. The serving base station 14 will relay the information, which may include a temporary handoff identification, to the mobile terminal 12. Regardless of whether pre-ranging is initiated, the base station 14 and the mobile terminal 12 will initiate a pre-handoff process, wherein the serving base station 14 may or may not transfer corresponding context information to the target base station 14 (step 410). The target base station 14 may assign a ranging resource, as well as connection identifications for the existing sessions.

At this point, a switch is made from the serving base station 14 to the target base station 14. If the handoff does not occur within a predefined time window after pre-ranging, the mobile terminal 12 may implement conditional initial ranging (step 412). The initial ranging allows the mobile terminal 12 to obtain the connection IDs for the session flows from the newly serving (target) base station 14, which may interact with the originally serving base station 14 through the WAN to obtain the information. The mobile terminal 12 will then initiate a re-authentication process (step 414), as well as a re-registration process, and then re-establish session flow (step 416). At this point, the base station 14 and the mobile terminal 12 will begin normal operation (step 418).

From the above, several observations may be made. When the serving base station 14 broadcasts its neighbors' information to the mobile terminal 12, information such as available bandwidth and an acceptable carrier-to-interference ratio threshold for the handoff may be added to the information. Such additional information will help the mobile terminal 12 determine which of the neighboring base stations 14 to scan in order to avoid an unnecessary scan of neighboring base stations 14 that cannot support a session requiring a certain bandwidth, quality of service, or would otherwise be overloaded if the session were taken over. These scans may be conditional and may only happen if there is no data pending transfer on either the downlink or uplink session flows. Pre-ranging may be conditional and performed only if there is a small amount of data to be transferred. If pre-ranging is not performed, the mobile terminal 12 will take the necessary steps to speed up initial ranging with the target base station 14 after a handoff is completed.

If pre-ranging is performed, the target base station 14 may first assign a dedicated uplink resource and a temporary handoff identification to the mobile terminal 12. The serving base station 14 may then relay those assignments to the mobile terminal 12 through control signaling. Such signaling may be a fast ranging information element used in the IEEE 802.16e. This action may avoid delay in ranging when the mobile terminal 12 waits for the fast ranging information element. The mobile terminal 12 may then use these resources to perform pre-ranging, wherein a temporary handoff identification may be used. The initial ranging to the target base station 14 may be conditional. If the handoff happens within a pre-defined time window after pre-ranging, initial ranging may be bypassed. During the handoff procedure, a target base station 14 can assign a basic connection ID, primary or secondary connection IDs, and maybe even flow connection IDs. The serving base station 14 may send such information to the mobile terminal 12 before handoff to avoid using renegotiation techniques to assign connection IDs, if an initial ranging to the target base station 14 can be bypassed.

Figure 4B:
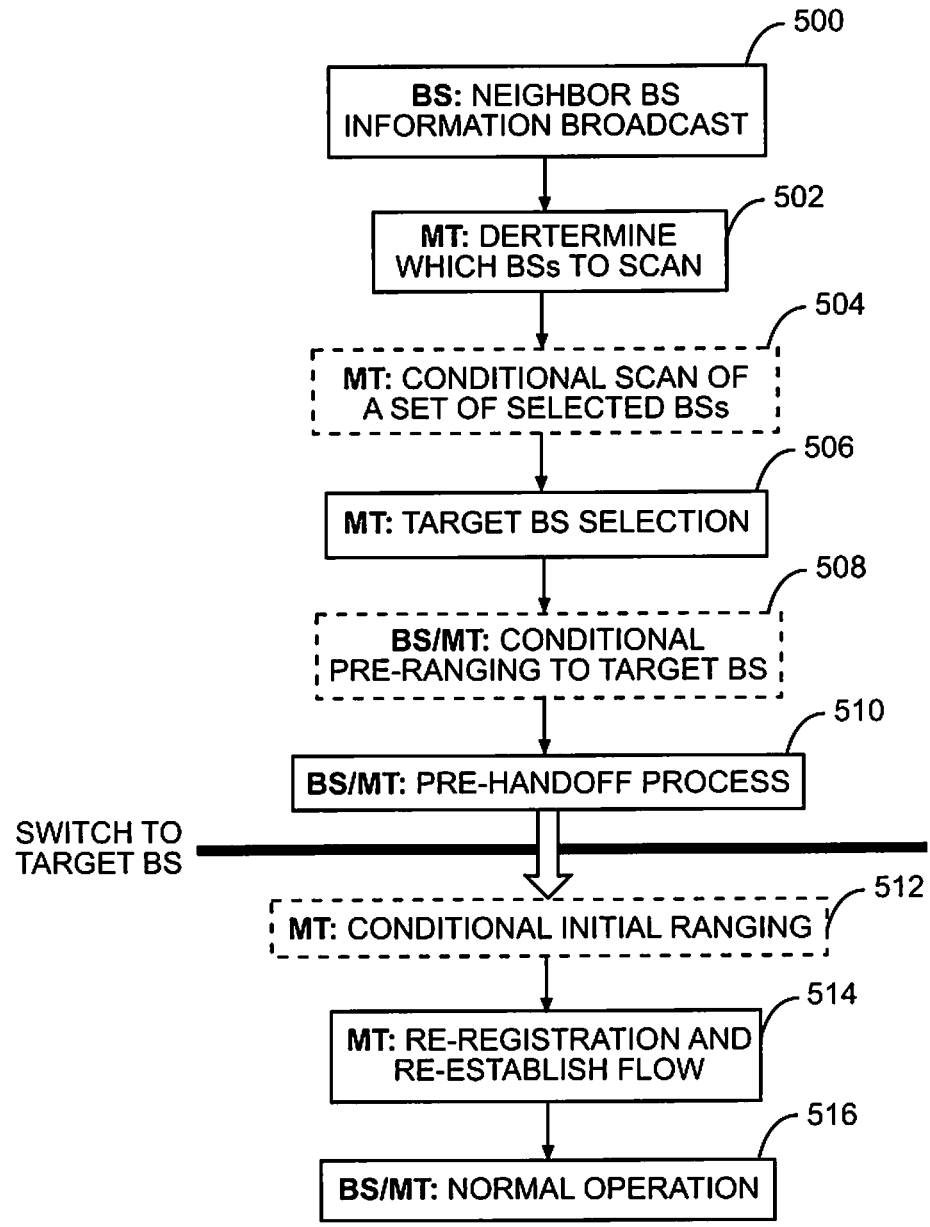
Figure 4C:
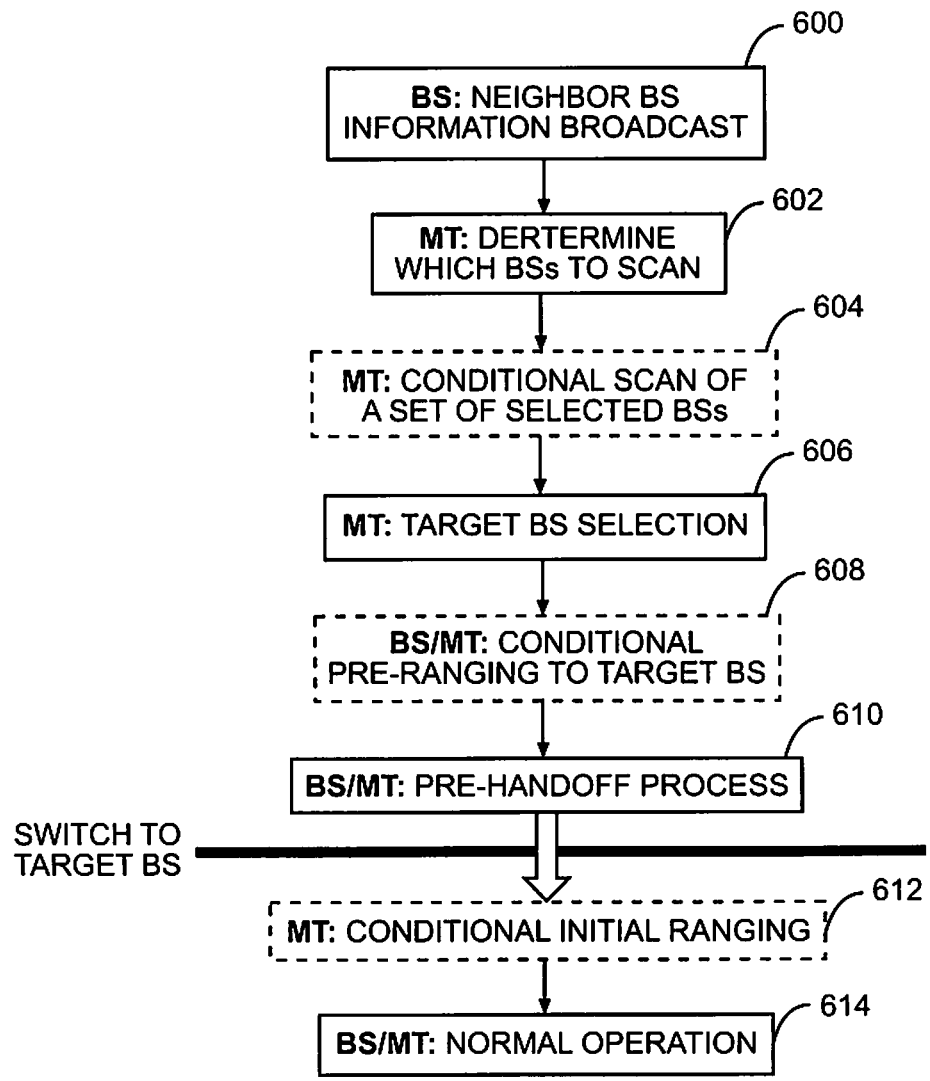

With reference to FIG. 4B, another hard handoff scenario is illustrated. The first five steps (steps 500-508) are the same as those illustrated in FIG. 4A (steps 400-408). This process differs in that the pre-handoff process (step 510) involves transferring level 2 context information. If level 2 context information is not shared, the serving base station 14 may transfer the level 2 context information to the target base station 14. The target base station 14 will then assign a dedicated uplink resource for initial ranging of the mobile terminal 12 and for obtaining the connection IDs. The target base station 14 will send this information to the serving base station 14, which will relay the information to the mobile terminal 12. Since the level 2 information relates to authentication, the re-authentication step (step 414 of FIG. 4A) is eliminated after switching to the target base station 14. As such, the mobile terminal 12 may initiate conditional initial ranging (step 512), as well as initiate re-registration and re-establish session flow (step 514). At this point, normal operation between the base station (target) 14 and the mobile terminal 12 begins (step 516).

With reference to FIG. 4C, again the first five steps of the process (steps 600-608) correspond to those steps (400-408) described in association with FIG. 4A. For the pre-handoff process (step 610), when level 3 context information is not shared, the serving base station may transfer the level 3 context information to the target base station 14. The target base station 14 will assign a dedicated uplink resource for the initial ranging of the mobile terminal 12 and the connection IDs. The target base station 14 will forward this information to the serving base station 14, which will relay it to the mobile terminal 12. Notably, transferring context information at level 3 implies that lower level context information, such as level 1 and level 2 context information, is included in the level 3 context information. As such, the level 3 context information will include information pertaining to authentication, registration, and control of session flows. As such, the steps of re-authentication, re-registration, and re-establishment of session flows are eliminated. After switching to the target base station 14, the mobile terminal 12 may initiate conditional initial ranging, if necessary (step 612) and then cooperate with the serving (target) base station 14 to begin normal operation (step 614).

As noted above, soft handoffs may be one of the types of handoffs available to the WAN and the mobile terminal 12. The soft handoffs may be implemented in different ways, as those skilled in the art will appreciate. One particular handoff that may be implemented is one referred to as "macro-diversity" soft handoff. The macro-diversity soft handoff has the following characteristics. For downlink communications, multiple base stations 14 will transmit the same PDUs to the target mobile terminal 12. The transmission of corresponding PDUs from the various base stations 14 will occur within a predefined period of time, wherein the mobile terminal 12 will use a soft combining process for decoding the transmitted PDUs, preferably prior to any forward error correction decoding. For uplink communications, transmission of the PDUs from a given mobile terminal 12 may be received and decoded by multiple base stations 14. The decoded PDUs from the various base stations 14 are then processed to recover the actual PDUs transmitted.

The set of base stations 14 involved in the macro-diversity soft handoff with a given mobile terminal 12 is referred to as the active set of base stations 14 for the mobile terminal 12. Different mobile terminals 12 may have different active sets of base stations 14. The active set of base stations 14 may be established by the mobile terminal 12, and maintained in the central network controller 16 or other desired location. Further, the active set of base stations 14 can be modified by the mobile terminal 12 as well as by the base stations 14.

During operation, each mobile terminal 12 will consistently measure all or a subset of the base stations 14 advertised by the WAN, including the signal strengths and the relative propagation delays based on the cell-specific pseudo noise (PN) codes transmitted in the preambles. The base stations 14 may also provide cell identification information through these advertisements. The mobile terminal 12 may identify the correlation peaks for all or a subset of the base stations 14, and the relative delays associated with the base stations 14. The mobile terminal 12 will then decide to add a base station 14 into the active set of base stations 14, if certain or all of the following criteria are met. First, if the signal strength, or correlation peak, associated with the base station 14 exceeds a certain predefined absolute threshold or relative threshold compared to a base station 14 associated with the best signal strength. Second, if the relative delay of the correlation peak for the associated base station 14, with respect to the best base station 14, falls within a prefix interval. If the delay is beyond a predetermined value, a hard handoff or fast base station selection can be applied. The mobile terminal 12 can adjust its timing according to the current timing and the relative delay between the serving base station 14 and the previously serving base station 14 during the handoff to help maintain time references for the relative delays.

Once the mobile terminal 12 identifies the candidate base stations 14 to be added to the active set of base stations 14, the mobile terminal 12 may send a message containing the signal strength and delay information of the candidate base stations 14 to the serving base station 14. This information may be sent over an uplink communication channel or sub-carrier in a layer 2 message. Based on the information sent by the mobile terminal 12 to the serving base station 14, the active set of base stations 14 may decide which of the candidate base stations 14 to add to the active set. The base stations 14 in the mobile terminal's current active set of base stations 14 may send an update message identifying the new active set of base stations 14 to the mobile terminal 12. The message may include an action time, at which both the mobile terminal 12 and the affected base stations 14 will update the active set of base stations 14 and operate using this active set of base stations 14.

Under the specific context of 802.16e, a mobile terminal 12 can establish parallel uplink and downlink sessions with multiple base stations 14 at the same time. These sessions may be connections or flows. In one embodiment, to support soft handoff in this scenario, the active set of base stations 14 will share level 3 or level 4 context information. For a given session, the mobile terminal 12 can establish a common connection identifier with multiple ones of the base stations 14 or a different connection identifier with each of the affected base stations 14. When different connection IDs are used, the connection IDs are uniquely mapped to the given session, and the mobile terminal 12 will know which connection IDs correspond to which base station connections for the session. The connection ID corresponding to each session is set up when the mobile terminal 12 adds a base station 14 into its active set of base stations 14.

In one embodiment, the downlink control signaling is sent via the serving base station 14 to the mobile terminal 12 when macro-diversity soft handoff is implemented. Alternatively, a new downlink control sub-channel can be defined and allocated to the mobile terminal 12. The control signaling on the sub-channel may be sent by all of the base stations 14 in the mobile terminal's active set of base stations 14.

The uplink feedback signaling may include the existing fast feedback channel, and a newly introduced cell switching channel. The uplink feedback signaling and other uplink control signaling can be received in either soft handoff or non-soft handoff modes. In a non-soft handoff mode, the uplink feedback and control signaling is received by the serving base station 14. The serving base station 14 may update the shared macro-diversity management context information among the appropriate base stations 14. In a soft handoff mode, the uplink feedback and control signaling is received by all of the base stations 14 in the mobile terminal's active set of base stations 14. The information decoded by each of the base stations 14 is effectively combined to recover the originally transmitted information and is processed accordingly. When multicasting from the active set of base stations 14, upper layer packets, such as the SDUs, are made available to the active set of base stations 14 that share the same macro-diversity context information. The active set of base stations 14 transmits the same set of PDUs, which are derived from the SDUs, to the mobile terminal 12. These transmissions will occur during a predefined window and will be soft combined at the mobile terminal 12 prior to decoding to recover the originally transmitted data. In an orthogonal frequency division multiple access (OFDM) system, the PDUs are sent in a downlink OFDM zone reserved for soft handoffs among the base stations 14 in the active set. The zone is generally defined as sub-carriers.

Figure 5B:
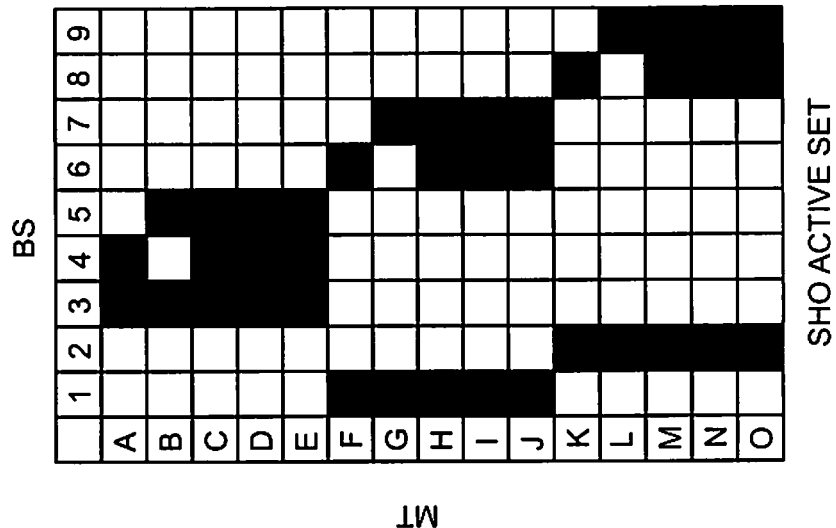
Figure 5A:
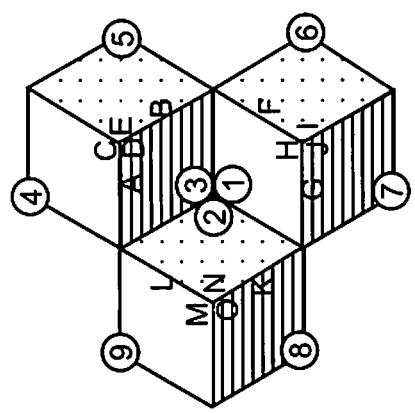

With reference to FIGS. 5A-5C, FIG. 5A illustrates a sectorized, three-cell communication environment and FIG. 5B is a graph illustrating the active set of base stations 14 for each mobile terminal 12. For clarity, the mobile terminals 12 are referenced as mobile terminals A-O and the base stations 14 are represented as base stations 1-9. The darkened boxes in each row represent the active set of base stations 14 for a given mobile terminal 12. For example, mobile terminal M has base stations 2, 8, and 9 in its active set of base stations 14. FIG. 5C illustrates a scheduling table for macro-diversity soft handoff. The table illustrates communication times, referenced as frame numbers, between the base stations 1-9 and the mobile terminals A-O. As illustrated, during frames 1 and 6, base stations 3, 4, and 5 will communicate with mobile terminal C, and so on.

Figure 6A:
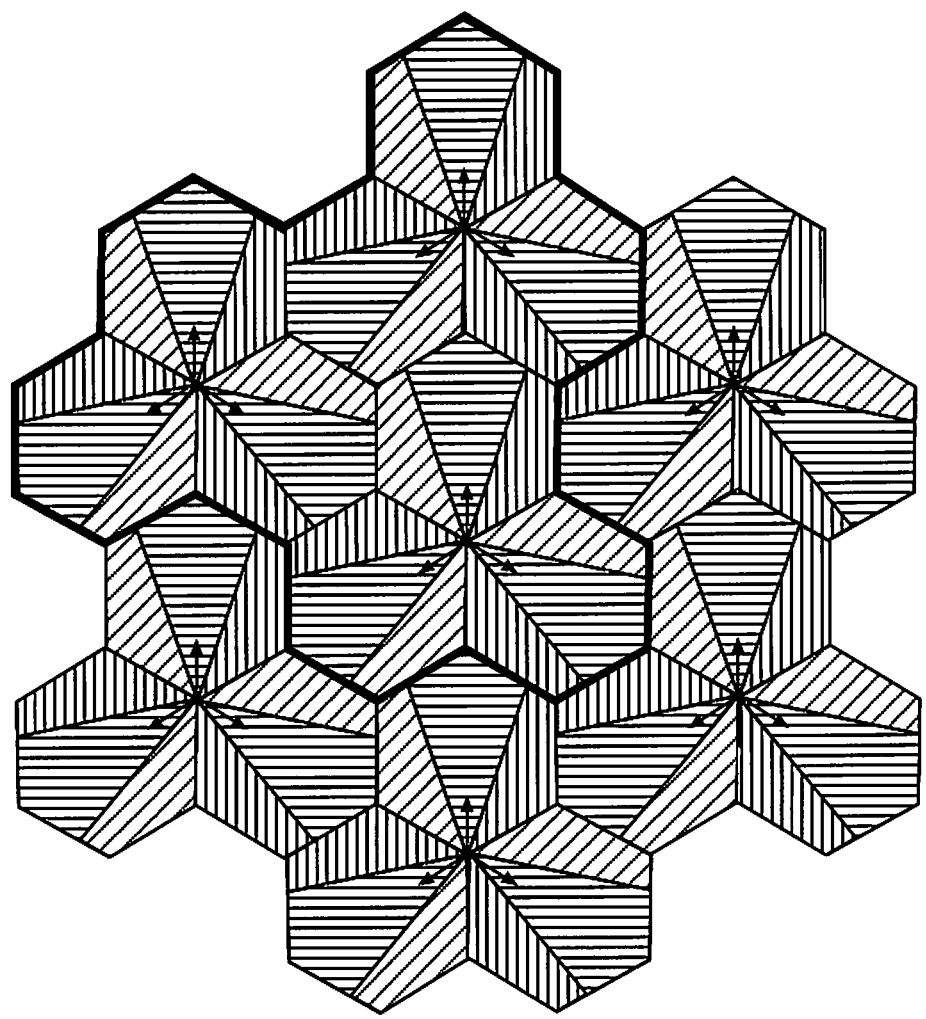
FIGS. 6A and 6B illustrate macro-diversity soft handoffs according to one embodiment of the present invention.
Figure 6B:
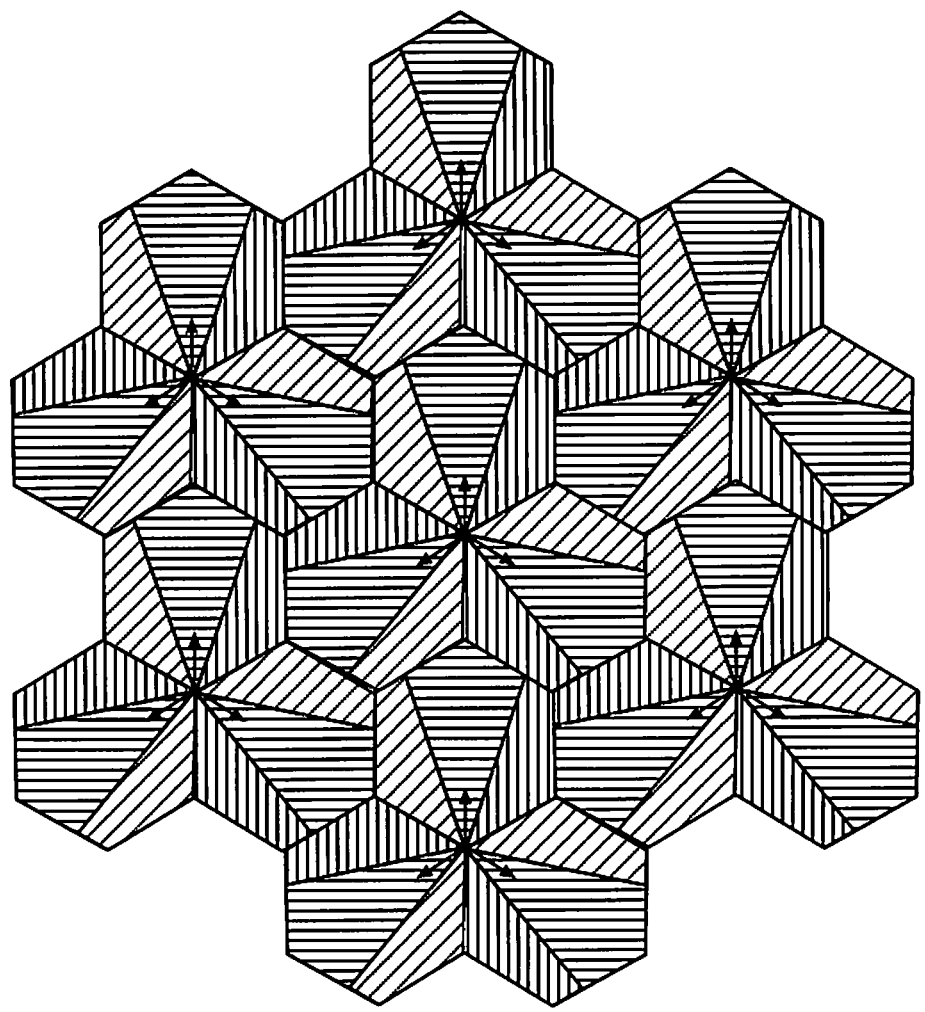

With reference to FIG. 6A, the three highlighted cells represent a cluster of base stations 14 within a distance corresponding to a prefix length, wherein the prefix is a prefix associated with a PDU. The cluster of base stations 14 may be defined when the WAN is deployed and the prefix length can be configured by the WAN. With reference to FIG. 6B, the sub-channel permutation in a soft handoff zone may be arranged as follows to achieve interference avoidance:

{(CellID)mod 2} for partition-B
{(CellID)mod 3} for partition-C

Turning now to FIGS. 7A and 7B, antenna assignment for communications in a macro-diversity soft handoff is addressed. As illustrated in FIG. 7A, two base stations 14, BS-1 and BS-2 are illustrated having antennas $\{\alpha, 1\}$ and $\{\beta, 1\}$ as well as $\{\alpha, 2\}$ and $\{\beta, 2\}$, respectively. For a single antenna, the two base stations BS-1 and BS-2 can use the following transmit formats: space-time transmit diversity (STTD), BLAST, and cyclic delay diversity (CDD).

For the multiple-input, multiple-output (MIMO) antenna configuration illustrated in FIG. 7A, an OFDM embodiment may have the sub-carriers (or sub-channels) broken into m sub-blocks as shown in FIG. 7B. Each sub-block will consist of two sub-channels, wherein the STTD and BLAST transmit formats can be used to implement space-time coding (STC). STC Pair-1 and STC Pair-2 are illustrated in FIGS. 7A and 7B.

With reference to FIGS. 8A and 8B, a three-base station configuration is illustrated to include base stations BS-1, BS-2, and BS-3. Base station BS-3 includes two antennas {α, 3} and {β, 3}. When using a single transmit antenna, the three base stations BS-1, BS-2, and BS-3 can use a CDD-BLAST transmit format. For MIMO antenna configurations, the soft handoff zone may consist of n sub-blocks, each consisting of three sub-channels wherein STTD and BLAST transmit formats can be used.

Figure 9A:
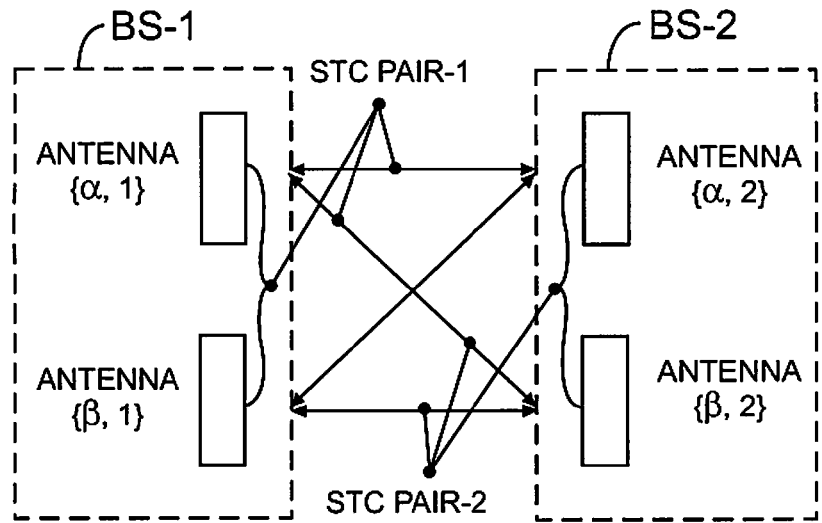
FIGS. 9A and 9B illustrate antenna assignment in a corresponding soft handoff zone construction according to a third embodiment of the present invention.
Figure 9B:
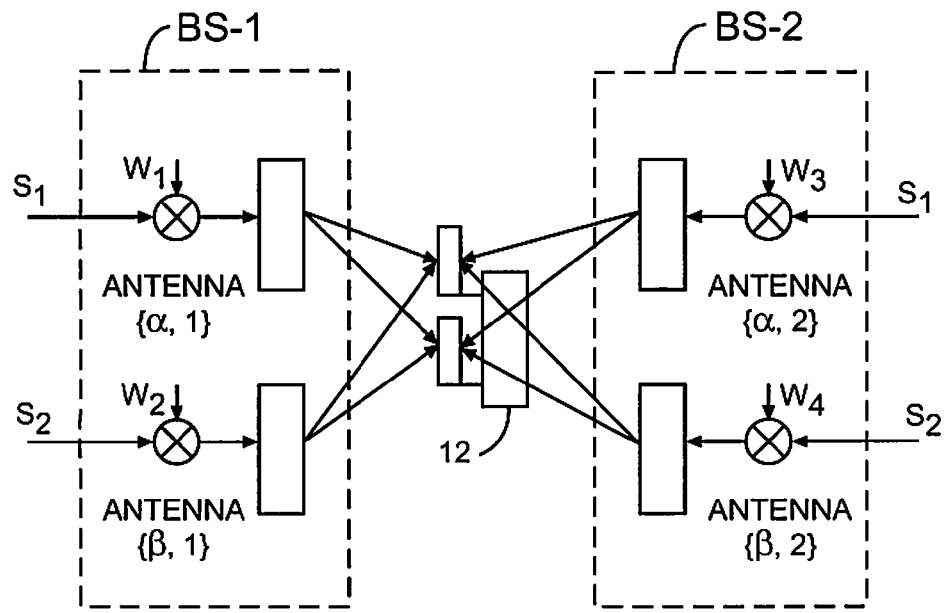

FIGS. 9A and 9B illustrate embodiments where the channel quality indicator channel can be used by the active base station 14 for antenna assignment and weighting ($W_1$-$W_4$) of the respective signals ($S_1$ and $S_2$). The embodiment of FIG. 9A may support a two-bit feedback for the four-antenna pairing configurations (sub-MIMO). FIG. 9B presents an embodiment where the channel quality indicator channel is used to feed back four antenna weights to facilitate beamforming for transmissions to the mobile terminal 12 or other base stations 14.

Figure 10:
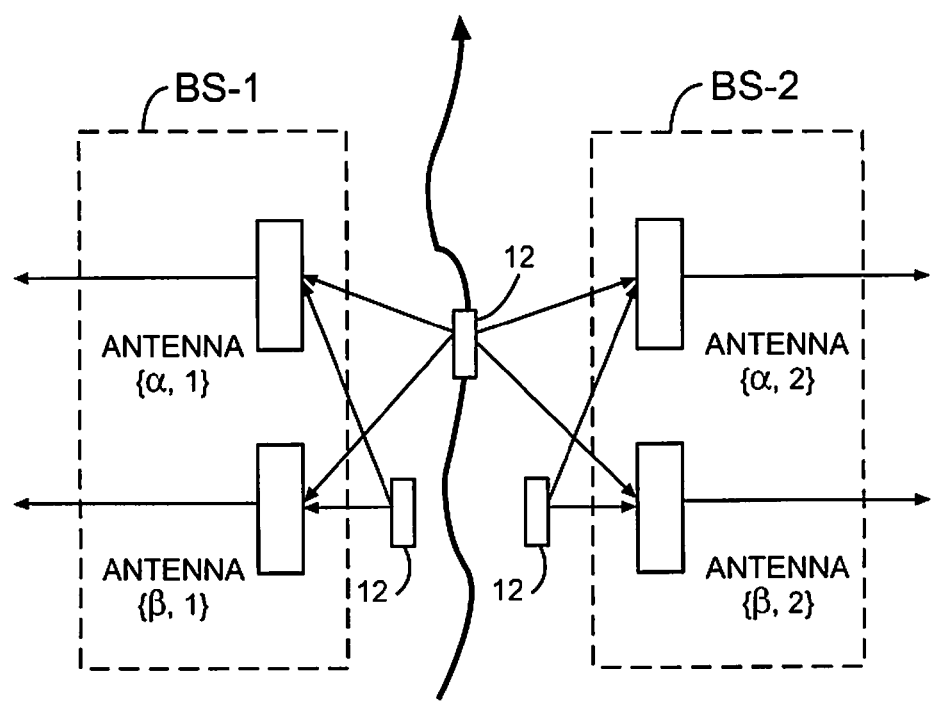
FIG. 10 illustrates antenna assignment in a corresponding soft handoff zone construction according to a fourth embodiment of the present invention.

For base stations 14 capable of performing uplink MIMO communications, the soft handoff zone can be overlaid atop a conventional soft handoff zone. As illustrated in FIG. 10, to reduce the interference of the regular traffic on the soft handoff traffic, as well as improve detection performance during movement, the visual MIMO soft handoff partner should be chosen from the mobile terminals 12 more proximate to the base stations BS-1 and BS-2.

For fast base station switching, an active set of base stations 14 is defined for each mobile terminal 12 supporting fast base station switching. The active set of base stations 14 is established based on the procedure described for soft handoffs. The mobile terminal 12 will actively switch among the base stations 14 in the active set of base stations 14, generally based on channel conditions. Preferably, the serving base station 14 is the one in the active set of base stations 14 that has the strongest downlink performance. Fast switching from the serving base station 14 to a target base station 14 may be triggered when the mobile terminal 12 detects a signal strength of a non-serving base station 14 as being higher than that of the currently serving base station 14 by a defined ratio, threshold, or other criteria. The mobile terminal 12 may send a Layer 2 message to the active set of base stations 14 to identify the target base station 14.

Alternatively, the mobile terminal 12 may send an indication on a control channel, referred to as a cell switch indication channel (CSICH). The CSICH may contain three bits of information to carry the compressed base station ID. The compressed base station ID is an ID assigned to a base station 14 when the base station 14 is added to the mobile terminal's active set of base stations 14. The base station ID is included in the active set update message, which is sent by the base station 14 to the mobile terminal 12. The switching will generally take place at a predefined time interval after the mobile terminal 12 sends the Layer 2 switching message or the CSICH. Alternatively, the base station 14 can send a cell switching direction Layer 2 message on the downlink channel to the mobile terminal 12 with an action time.

With regard to ranging, no ranging is needed before switching when the mobile terminal 12 is switching to a base station 14 in the active set of base stations 14. For traffic flow continuity, the serving base station 14 can transfer the mobile terminal's PDUs, which may be Layer 2 frames, and Layer 2 automatic receipt request (ARQ) status to the target base station 14 when the traffic data and level 4 context information of the mobile terminal 12 are not shared by both the serving and target base stations 14. If level 4 context information is not shared by the serving and target base stations 14, the traffic data can be made available to both the serving and target base stations 14. In this case, the serving base station 14 only needs to inform the target base station 14 of the PDUs that the target base station 14 should start transmitting to the mobile terminal 12.

From the above, fast base station switching is a feature that allows the mobile terminal 12 to quickly switch from one base station 14 to another within the active set of base stations 14. To support fast base station switching, the present invention provides a mechanism for the mobile terminal 12 to use to report the newly selected anchor (target) base station 14 and a way to synchronize when actual switching to the new anchor base station 14 occurs. In a first scenario, the mobile terminal 12 uses a dedicated uplink channel to report the selected anchor base station 14. Accordingly, the mobile terminal 12 reports the selection of an anchor base station 14 using one or more dedicated anchor base station selection (ABSS) feedback channels during uplink communications. The ABSS feedback channel or channels are allocated to the mobile terminal 12 by the base station 14. The mobile terminal's operation is as follows.

Assuming the mobile terminal's current anchor base station 14 is base station A, assume mobile terminal 12 decides to select base station B as the new anchor base station. The mobile terminal 12 will send the selection information on the ABSS feedback channel and then start a timer for a transition period. If the mobile terminal 12 does not receive any downlink control signaling from base station A indicating canceling of a switching operation to base station B, or indicating a target anchor base station C during the action time for switching before the switch indication retransmission timer times out, the mobile terminal 12 will switch to anchor base station B when the timer times out. If the mobile terminal 12 receives information indicating the switching operation to base station B should be cancelled before the switch indication retransmission timer times out, the mobile terminal 12 will send an acknowledgement message to acknowledge the receipt of the information. The mobile terminal 12 will then cancel the switching operation and disable the switch indication retransmission timer.

If the mobile terminal 12 receives information indicating a target anchor base station C and an action time for switching before the switch transition period times out, the mobile terminal 12 will send an acknowledgement message to acknowledge receipt of the information. The mobile terminal 12 will then reset the switch indication retransmission timer to the action time and switch to the target anchor base station C when the switch indication retransmission timer times out. After the mobile terminal 12 sends the selection information on the ABSS feedback channel to indicate a newly selected anchor base station B, the mobile terminal 12 will not send selection information indicating another new anchor base station C before the switch indication retransmission timer times out. However, the mobile terminal 12 may send the selection information on the ABSS feedback channel indicating the selection of base station A as the anchor base station 14. It is then up to the serving base station A to decide whether to send information to cancel the switch to base station B.

If base station A receives the selection information on the ABSS feedback channel from the mobile terminal 12 indicating newly selected anchor base station B, base station A may choose to send information to the mobile terminal 12 before the switch indication retransmission timer times out. The information may cause the mobile terminal 12 to cancel the switching operation to base station B, or to switch to a particular target anchor base station 14 at a specific action time.

In another scenario, the mobile terminal 12 may use a machine access control (MAC) header or sub-header to report the selected anchor base station 14. The mobile terminal 12 may report the selection of an anchor base station 14 using one or more ABSS feedback channels on the uplink. The ABSS feedback channels are allocated to the mobile terminal 12 by the base station 14. Assuming the current anchor base station 14 is base station A, the mobile terminal 12 may decide to select base station B as the new anchor base station 14. The mobile terminal 12 will send the selection information in the mode selection feedback MAC header when no uplink traffic is present, or in a sub-header when uplink traffic is present. The mobile terminal 12 will then start a timer, referred to as a switch indication retransmission timer. If the mobile terminal 12 does not receive any downlink control signaling from base station A indicating that switching operation to base station B should be cancelled, or indicating a target anchor base station C and an action time for switching, before the switch indication retransmission timer times out, the mobile terminal 12 will resend the mode selection feedback MAC header or sub-header, and restart the switch indication retransmission timer. If the mobile terminal 12 receives information indicating canceling of the switching operation to base station B before the switch indication retransmission timer times out, the mobile terminal 12 will send an acknowledgement message to acknowledge receipt of the information. The mobile terminal 12 may cancel the switching operation and disable the switch indication retransmission timer. If the mobile terminal 12 receives information indicating a target anchor base station C and an action time for switching before the switch indication retransmission timer times out, the mobile terminal 12 will send an acknowledgment message to acknowledge receipt of the information. The mobile terminal 12 will then set the switch transmission period timer to the action time, and will switch the target anchor base station C when the switch indication retransmission timer times out.

After the mobile terminal 12 sends the selection information on the ABSS feedback channel indicating newly selected anchor base station B, the mobile terminal 12 may not send selection information indicating another new anchor base station 14 before the switch indication retransmission timer times out. However, the mobile terminal 12 may send the selection information on the ABSS feedback channel indicating selection of base station A as the anchor base station 14. It is then up to base station A to decide whether to send information to cancel the switch to base station B.

If base station A receives selection information on the MAC header or sub-header from the mobile terminal 12 identifying newly selected anchor base station B, base station A will send information to the mobile terminal 12 before the switch indication retransmission timer times out at the mobile terminal 12. The information will trigger the mobile terminal 12 to cancel the switch to base station B, or cause the mobile terminal 12 to switch to a particular target anchor base station 14 at a specific action time.

The information referenced above may be provided in an anchor base station switch information element. When the base station 14 sends an anchor base station switch information element to the mobile terminal 12, the base station 14 will at the same time allocate uplink channel resources to the mobile terminal 12 to send an acknowledgement of the receipt of the anchor base station switch information element. After the mobile terminal 12 receives the anchor base station switch information element, the mobile terminal 12 will send an acknowledgement on the uplink channel resource allocated by the base station 14. In one embodiment of the invention, the acknowledgement is carried by the MAC header, if no concurrent uplink burst allocation is present, or a MAC sub-header, if concurrent uplink burst allocation is present. The base station 14 will allocate sufficient uplink channel resources for the mobile terminal 12 to send the MAC header or sub-header. In another embodiment, the format of the MAC header and sub-header are in the form of the mode selection feedback MAC header and sub-header, respectively.

In one embodiment, the mobile terminal 12 may operate in a sleep mode. While in the sleep mode, the mobile terminal 12 is unavailable to the serving base station 14 for uplink and downlink traffic. The mobile terminal's sleep interval consists of sleep windows interleaved with listening windows. During sleep windows, the mobile terminal 12 does not receive any control information and does not receive or transmit any uplink or downlink traffic. During listening windows, the mobile terminal 12 listens to downlink broadcasts of synchronization information, control signaling, and broadcast MAC messages. The present invention also provides a mechanism to support soft handoff and fast base station switching for mobile terminals 12 in sleep mode.

For normal mode, an active set of base stations 14 is maintained for the mobile terminal 12 while operating in soft handoff or fast base station switching. For sleep mode, an active set of base stations 14 is also maintained. While in sleep mode, the mobile terminal 12 will continue to measure the signal strength of serving and neighboring base stations 14. During the sleep window, if the mobile terminal 12 detects that a neighbor base station 14 not currently in the active set has a signal strength higher than a specific threshold, or if the mobile terminal 12 detects that a base station 14 currently in the active set has a signal strength lower than a specific threshold, the mobile terminal 12 will wake and maintain synchronization for uplink and downlink communications on the current anchor base station 14. Once synchronized, the mobile terminal 12 will initiate updating of the active set of base stations 14. Once the active set of base stations 14 is updated, and if the mobile terminal 12 is still within the sleep window, the mobile terminal 12 will go back into sleep mode. If the mobile terminal 12 is within the listening window after the actives set of base stations 14 is updated, the mobile terminal 12 will remain in the listening mode.

During the listening window, the mobile terminal 12 will synchronize uplink and downlink communications with the anchor base station 14. If the mobile terminal 12 detects that a neighbor base station 14 that is not currently in the active set has a signal strength higher than a specific threshold or if the mobile terminal 12 detects that a base station 14 currently in the active set has a signal strength lower than a specific threshold, the mobile terminal 12 will update the active set. Once the active set of base stations 14 is updated and if the mobile terminal 12 is still within the listening window, the mobile terminal 12 will remain in listening mode. If the mobile terminal 12 is within the sleep window after the active set of base stations 14 is updated, the mobile terminal 12 will remain in sleep mode.

For normal mode, fast anchor base station selection information is sent to the mobile terminal 12 on either a dedicated uplink channel allocated by the base station 14, or on a mode selection feedback MAC header or sub-header. For the case of sleep mode, the mobile terminal 12 will not be assigned a dedicated uplink channel, such as the ABSS feedback channel, since this will cause unnecessary overhead. The mobile terminal 12 will instead use the mode selection feedback MAC header to send anchor base station selection information. While in a sleep mode, the mobile terminal 12 will continue to measure the signal strength of the serving and neighboring base stations 14. During the sleep window, if the mobile terminal 12 decides to select a new anchor base station 14 based on various criteria, such as signal strength, the mobile terminal 12 will awake and synchronize to the current anchor base station 14. Once synchronized, the mobile terminal 12 will initiate fast anchor base station updating by sending a bandwidth request ranging code. Once the base station 14 detects the bandwidth request ranging code, the base station 14 will allocate an uplink resource for the mobile terminal 12 to send the mode selection feedback MAC header. Once the mobile terminal 12 receives the uplink resource allocation, the mobile terminal 12 will send the mode selection feedback MAC header to carry the information on the anchor base station selection. The anchor base station update operation continues as in the case of normal mode. Once the anchor base station update operation is completed, and if the mobile terminal 12 is still within the sleep window, the mobile terminal 12 will go back to sleep mode. If the mobile terminal is within the listening window after the anchor base station update operation is completed, the mobile terminal 12 will remain in listening mode.

During the listening window, if the mobile terminal 12 decides to select a new anchor base station 14 based on a factor such as signal strength, the mobile terminal 12 will synchronize with the current anchor base station 14. Once synchronized, the mobile terminal 12 will initiate fast anchor base station updating by sending a bandwidth request ranging code. Once the base station 14 detects the bandwidth request ranging code, the base station 14 will allocate uplink resources for the mobile terminal 12 to send the mode selection feedback MAC header. Once the mobile terminal 12 receives the uplink resource allocation, the mobile terminal 12 will send the mode selection feedback MAC header to carry the information on the new anchor base station selection. The anchor base station update operation continues as in the case of normal mode. Once the anchor base station update operation is completed, and if the mobile terminal 12 is still within the listening window, the mobile terminal 12 will remain in listening mode. If the mobile terminal 12 is within the sleep window after the anchor base station update operation is completed, the mobile terminal 12 will remain in sleep mode.

As noted, there are several types of soft handoffs, some of which use an active set of base stations 14 of base stations 14. With macro-diversity soft handoff, the active set of base stations 14 may transmit in exactly the same time, frequency window. For example, for OFDM, there is a frequency dimension consisting of sub-carriers, and a time dimension consisting of OFDM symbols. With selective soft handoff, different base stations 14 may transmit with different windows in the time/frequency plane. Then a receiver can detect multiple signals separately and make a selection between them. With fast base station switching, the mobile terminal 12 only communicates with a single base station 14 at a time. This does not require a synchronized CID. A re-negotiation can take place each time there is a switch in base stations 14

Typically, an anchor base station 14 is identified for the purpose of downlink signaling. The mobile terminal 12 can receive multiple downlink traffic channels, but has a dedicated control channel from the anchor base station 14 for signaling.

Certain embodiments of the invention provide solutions to CID management, active set establishment and management, anchor base station 14 switching, UL feedback channel (CQICH) switching, UL feedback channel reporting, and UL data transmission for each of the above introduced soft handoff schemes. These are particularly suited to, but not limited to, implementations of the 802.16e standard.

CID Management

In macro-diversity soft handoff implementations, for selective soft handoff implementations, and for MIMO BLAST implementations, according to select embodiments of the invention, all members of the active set of base stations 14 assign the same CIDs, and the CIDs are then updated if needed when any new base station(s) 14 is added to active set of base stations 14. For example, if base station 14A and base station 14B are in the active set of base stations 14, and CID0000 is being used, when base station 14C is added, it may be necessary to update the CID so that all three base stations 14A-14C can use the same CID.

With fast base station switching implementations, when the anchor base station 14 is switched, the CID is updated if needed. There is no need to synchronize CIDs among base station 14s in an active set of base stations 14 for such implementations.

Active Set Establishment and Management

For macro-diversity soft handoff implementations, preferably a set of messages are established to allow management and establishment of the active set of base stations 14:

MOB_MSsoft handoff_REQ (mobile subscriber station handoff request) is a message for allowing a mobile terminal 12 to request soft handoff or request a change in members of the active set of base stations 14. The mobile terminal 12 monitors neighbors and reports signal strengths, and identifies the base stations 14 that it wants to be part of the active set of base stations 14.

MOB_Bsoft handoff_REP (base station handoff response) is a message in response to the above request in which the base station 14 indicates which base stations 14 should be in the active set of base stations 14. Preferably, a flag will be employed to indicate which base station 14 is the anchor base station 14.

MOB_HO_IND is a message that confirms the update of the active set of base stations 14.

MOB_Bsoft handoff_REQ is a message for the base station 14 to initiate a handoff. It contains a recommended active set of base stations 14.

MOB_MSsoft handoff_RSP is a response from the mobile terminal 12 to the base station initiated handoff.

For selective soft handoff implementations, preferably a set of messages is established to allow management and establishment of the active set of base stations 14:

MOB_MSsoft handoff_REQ (mobile subscriber station handoff request) is a message for allowing a mobile terminal 12 to request soft handoff or request a change in members of the active set of base stations 14. The mobile terminal 12 monitors neighbors and reports signal strengths, and identifies the base stations that it wants to be part of the active set of base stations 14.

MOB_Bsoft handoff_REP (base station handoff response) is a message in response to the above request in which the base station 14 indicates which base station(s) 14 should be in the active set of base stations 14. Preferably, a flag will be employed to indicate which base station 14 is the anchor base station 14.

MOB_HO_IND is a message that confirms the active set of base stations 14 update.

MOB_Bsoft handoff_REQ is a message for the base station 14 to initiate a handoff. It contains a recommended active set of base stations 14.

MOB_MSsoft handoff_RSP is a response from the mobile terminal 12 to the base station initiated handoff.

For Fast cell switching implementations, preferably a set of messages are established to allow management and establishment of the active set of base stations 14:

MOB_MSsoft handoff_REQ (mobile subscriber station handoff request) is a message for allowing a mobile terminal 12 to request soft handoff or request a change in members of the active set of base stations 14. The mobile terminal 12 monitors neighbors and reports signal strengths, and identifies the base stations 14 that it wants to be part of the active set of base stations 14.

MOB_Bsoft handoff_REP (base station handoff response) is a message in response to the above request in which the base station 14 indicates which base stations 14 should be in the active set of base stations 14. Preferably, a flag will be employed to indicate which base station 14 is the anchor base station 14.

MOB_HO_IND is a message that confirms the update of the active set of base stations 14.

MOB_Bsoft handoff_REQ is a message for the base station 14 to initiate a handoff. It contains a recommended active set of base stations 14.

MOB_MSsoft handoff_RSP is a response from the mobile terminal 12 to the base station initiated handoff.

For MIMO Blast implementations, preferably a set of messages are established to allow management and establishment of the active set of base stations 14:

MOB_MSsoft handoff_REQ (mobile subscriber station handoff request) is a message for allowing a mobile terminal 12 to request soft handoff or request a change in members of the active set of base stations 14. The mobile terminal 12 monitors neighbors and reports signal strengths, and identifies the base stations 14 that it wants to be part of the active set of base stations 14.

MOB_Bsoft handoff_REP (base station handoff response) is a message in response to the above request in which the BTS indicates which base stations 14 should be in the active set of base stations 14. Preferably, a flag will be employed to indicate which base station 14 is the anchor base station 14.

MOB_HO_IND is a message that confirms the update of the active set of base stations 14.

MOB_Bsoft handoff_REQ is a message for the base station 14 to initiate a handoff. It contains a recommended active set of base stations 14.

MOB_MSsoft handoff_RSP is a response from the mobile terminal 12 to the base station initiated handoff.

Anchor Base Station 14 Switching

For Macro-diversity soft handoff, a number of anchor base station 14 switching options are provided:

Option 1—Message Handshake:
mobile terminal 12 initiated—use the above introduced active set update messages (MOB_MSsoft handoff-REQ/MOB_Bsoft handoff_RSP/MOB_HO_IND), but include an additional field to indicate the anchor base station.

base station 14 initiated use the above introduced Active set update messages (MOB-Bsoft handoff-REQ/MOB_HO_IND), but include an additional field to indicate the anchor base station.

Option 2—Define a New DL MAP IE (Anchor Switching Information Element) to Indicate Anchor Switching
mobile terminal 12 initiated: MOB_MSsoft handoff-REQ/anchor switching IE
base station 14 initiated: MOB_Bsoft handoff-REQ/MOB_MSsoft handoff-RSP/anchor base station 14 switching IE Option 3—Define a New Feedback Reporting IE and Anchor Switching IE.
Mobile terminal initiated: Feedback_reporting_IE (sent by base station 14)/Anchor base station 14 indication (sent by mobile terminal 12 over feedback channel)/anchor_switching IE. With this solution, in some embodiments, the feedback_reporting_IE is used for both feeding bask C/I information and for sending an anchor base station identifier. Some indication needs to be generated either at the base station 14 or mobile terminal 12 to convey that a given feedback_reporting_IE will contain the anchor base station identifier instead of the carrier-to-interference ratio information.

Option 4—Monitor Multiple Base Station 14s
Same as above 3 options with one exception that the mobile terminal 12 monitors the MAPs (resource allocations—might for example have time and sub-carrier information for OFDM applications but may be different for different physical layers) from all member base stations 14 to know when and to which base station 14 to switch. The base station 14 that sends the new MAP is the new anchor.

Option 5—Define New Dedicated Anchor Base Station 14 Switching Channel for a Mobile Terminal 12 that Supports Soft Handoff or Fast Base Station Switching
For selective soft handoff, the options presented above for macro-diversity soft handoff are also provided.
For fast base station switching, again a number of implementations are provided.

Option 1—Message Handshake
Same as macro-diversity soft handoff

Option 2—Using Feedback Channel and Other BS IE as a Pointer (Empty Resource)
Mobile terminal 12 initiated: periodic indication over Feedback channel/Other_BS_IE
base station 14 initiated: Other_BS_IE Option 3—Define New Feedback Reporting IE to Indicated Reporting Content at the Next Transmission of Feedback Channel
Mobile terminal 12 initiated: feedback_reporting_IE (base station 14 sent)/base station 14 switching indication (mobile terminal 12 sent over feedback channel)/Other_BS_IE Option 4—Define New Feedback Reporting IE and Anchor Switching IE
Mobile terminal 12 initiated: Feedback_reporting_IE (sent by base station 14)/Anchor base station 14 indication (sent by mobile terminal 12S over feedback channel)/anchor_switching IE. With this solution, in some embodiments, the feedback_reporting_IE is used for both feeding bask C/I information and for sending an anchor base station 14 identifier. Some indication needs to be generated either at the base station 14 or mobile terminal 12 to convey that a given feedback_reporting_IE will contain the anchor base station 14 identifier instead of the C/I information.

Option 5—monitor multiple base station 14s
Same as above 4 options with the exception that the mobile terminal 12 monitors the MAPs from all member base stations 14 to know when and to which base station 14 to switch.

For MIMO blast soft handoff implementations, the solutions provided above for macro-diversity soft handoff also apply.

UL Feedback Channel Switching
  For Macro-Diversity Soft Handoff Implementations:
    Option 1: The feedback channel assignment can be included in MOB-Bsoft handoff_REQ/RSP message synched with anchor base station 14 switching and the real switching happens at the action time.
    Option 2: If anchor_switching IE is defined, a new feedback channel assignment of new feedback channel can be included.
    Option 3: At the first frame after action time, new anchor base station 14 can assign a new feedback channel either through CHICH_Alloc_IE or feedback channel subheader.
  For Selective Soft Handoff Implementations:
    Option 1: The feedback channel assignment can be included in MOB-Bsoft handoff_REQ/RSP message synched with anchor base station 14 switching and the real switching happens at the action time.
    Option 2: If anchor_switching IE is defined, a new feedback channel assignment of new feedback channel can be included.
    Option 3: At the first frame after action time, new anchor base station 14 can assign a new feedback channel either through CHICH_Alloc_IE or feedback channel subheader.
  For Fast Base Station Switching Implementations:
    Option 1: The feedback channel assignment can be included in MOB-Bsoft handoff_REQ/RSP message synched with anchor base station 14 switching and the real switching happens at the action time
    Option 2: If anchor_switching IE is defined, a new feedback channel assignment of new feedback channel can be included
    Option 3: At the first frame after action time, new anchor base station 14 can assign a new feedback channel either through CHICH_Alloc_IE or feedback channel subheader
  For MIMO Blast Implementations:
    Option 1: The feedback channel assignment can be included in MOB-Bsoft handoff_REQ/RSP message synched with anchor base station 14 switching and the real switching happens at the action time.
    Option 2: If anchor_switching IE is defined, a new feedback channel assignment of new feedback channel can be included.
    Option 3: At the first frame after action time, new anchor base station 14 can assign a new feedback channel either through CHICH_Alloc_IE or feedback channel subheader.
UL Feedback Channel Reporting
  For Macro-diversity soft handoff implementations, UL feedback channel reporting involves reporting an average C/I of all member base stations 14.
  For selective soft handoff implementations, UL feedback channel reporting involves reporting an average C/I of all member base stations 14.
  For MIMO blast implementations, UL feedback channel reporting involves reporting an average C/I of all member base stations 14.
  For fast base station switching, only the anchor base station's C/I is reported.
DL Data Transmission
  For Macro-diversity soft handoff implementations, the mobile terminal 12S monitors anchor base station 14. Only the anchor base station 14 sends MAP (resource assignment). The mobile terminal 12S monitors only the anchor base station 14's control messages
  For Selective Soft Handoff Implementations:
    Option 1—the mobile terminal 12S monitors the anchor base station 14. Only the anchor base station 14 sends MAP include MAP_IE and Other base station 14 IE(s)
    Option 2—mobile terminals 12 monitor all member base stations' DL MAP. All transmitting base stations 14 (may be less than the active set of base stations 14) send their MAPs, and the mobile terminals 12 monitor all member base stations' MAPs.
    For fast base station switching implementations the mobile terminal 12 monitors only the anchor base station 14 after anchor base station 14 switching.
  For MIMO Blast Implementations:
    Option 1—mobile terminal 12 monitors only anchor base station 14 (new basic_DL_MIMO_other_base station 14 IE defined). Only anchor base station 14 sends MAP include basic_MIMO_DL_MAP_IE and basic_MIMO_Other base station IE(s), and the mobile terminal 12 only monitors the anchor base station 14.
    Option 2—mobile terminal 12S monitors all members' MAPs. All transmitting base stations 14 (may be less than the active set of base stations 14) send their basic_MIMO_MAP les, and the mobile terminal 12 monitors all member base stations' MAPs.
UL Data Transmission
  For Macro-diversity soft handoff implementations, mobile terminal 12 monitors anchor base station 14. Only the anchor base station 14 sends MAP. The mobile terminal 12 monitors only the anchor base station's control messages.
  For selective soft handoff implementations mobile terminal 12 monitors only anchor base station 14, this being the same as macro-diversity soft handoff.
  For fast base station switching implementations, mobile terminal 12 monitors only the anchor base station 14 after anchor base station switching.
  For MIMO blast implementations, mobile terminal 12 monitors only anchor base station 14. Only the anchor base station 14 sends MAP including basic_MIMO_UL_MAP_IE, and mobile terminal 12 only monitors anchor base station 14.
  In some embodiments, a harmonized solution is provided. The solution is particularly suited to, but not limited to, applications where the switching frequency of anchor base station 14 (sending MAP and allocating UL resource for feedback channel of a mobile terminal 12 in soft handoff) in soft handoff is the same as that in FCS (fast base station switching).
Harmonized Anchor Base Station Switching:
    Option 1—Using MOB_MSsoft handoff_REQ/MOB_Bsoft handoff_RSP.
    Option 2—define feedback channel reporting IE (poll one or multiple mobile terminal 12S to report their anchor base station 14 using feedback channel/anchor switching IE (indicate anchor switching and assigning new feedback channel).
    Option 3: introduce a new dedicated UL anchor for base station 14 switching. Define a reply with an anchor switching_IE from the base station 14.
Harmonized DL Traffic Transmission Solution
  The mobile terminal 12 only monitors the anchor base station 14 for DL/UL traffic process control commands. The anchor base station 14 sends current DL DL MAP IE and may include other base station IEs as required. Detailed examples for each of the soft handoff formats will now be provided:
  Macro-Diversity Soft Handoff
  Anchor sends DL MAP IE.
    mobile terminal 12 monitors only anchor base station 14 and the DL traffic process is transparent to mobile terminal 12 since the other base station 14 will transmit using the same resources and will appear as a multi-path component.

Selective Soft Handoff

Anchor sends DL MAP IE and Other base station 14 IE.

mobile terminal 12 monitor only the anchor base station 14 and receives a MAP for both the Anchor and the other base station 14, and will understand that a selective combining is needed.

Fast Base Station Switching

Same as macro-diversity soft handoff.

MIMO Blast

Same as selective soft handoff.

Hybrid soft handoff and no soft handoff application—in some instances one application may be delay-sensitive and require soft handoff while another application running on the same mobile terminal 12 is not delay-sensitive and does not require soft handoff. A hybrid solution is provided to deal with this by sending more than one MAP. In some embodiments, a bit is included to indicate soft handoff type. For example, soft handoff type=1 might indicate macro-diversity, and soft handoff type=0 might indicate selection diversity. Other values of course may be used.

For macro-diversity, one MAP is sent for the real time application, and another for the other application. For selective diversity, one MAP is sent for the anchor base station 14 for the real time application, and another for the second application. A third MAP is sent for the other real time base station 14, and selection diversity can be performed as before.

Figure 11:
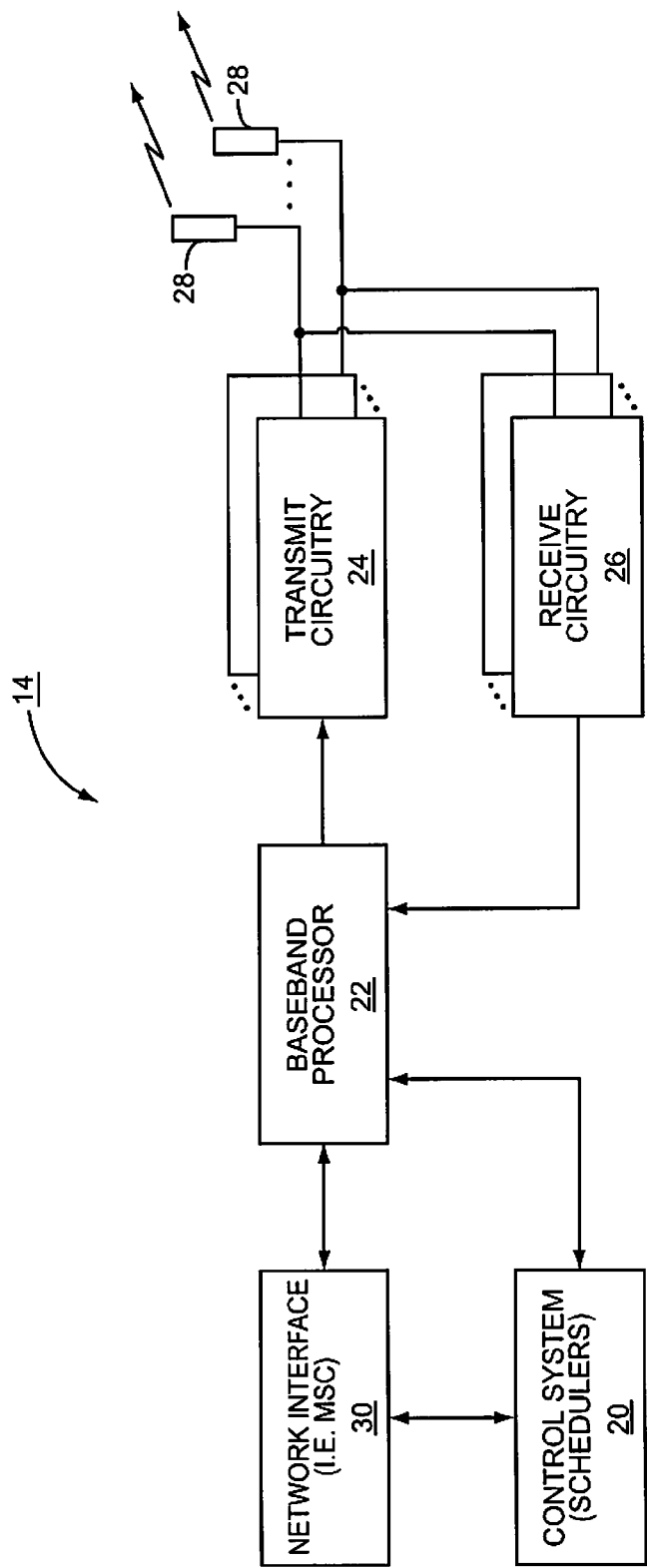
FIG. 11 is a block representation of a base station according to one embodiment of the present invention.

With reference to FIG. 11, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by mobile terminals 12. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 12 serviced by the base station 14. The network interface 30 will typically interact with the central network controller 16 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 12:
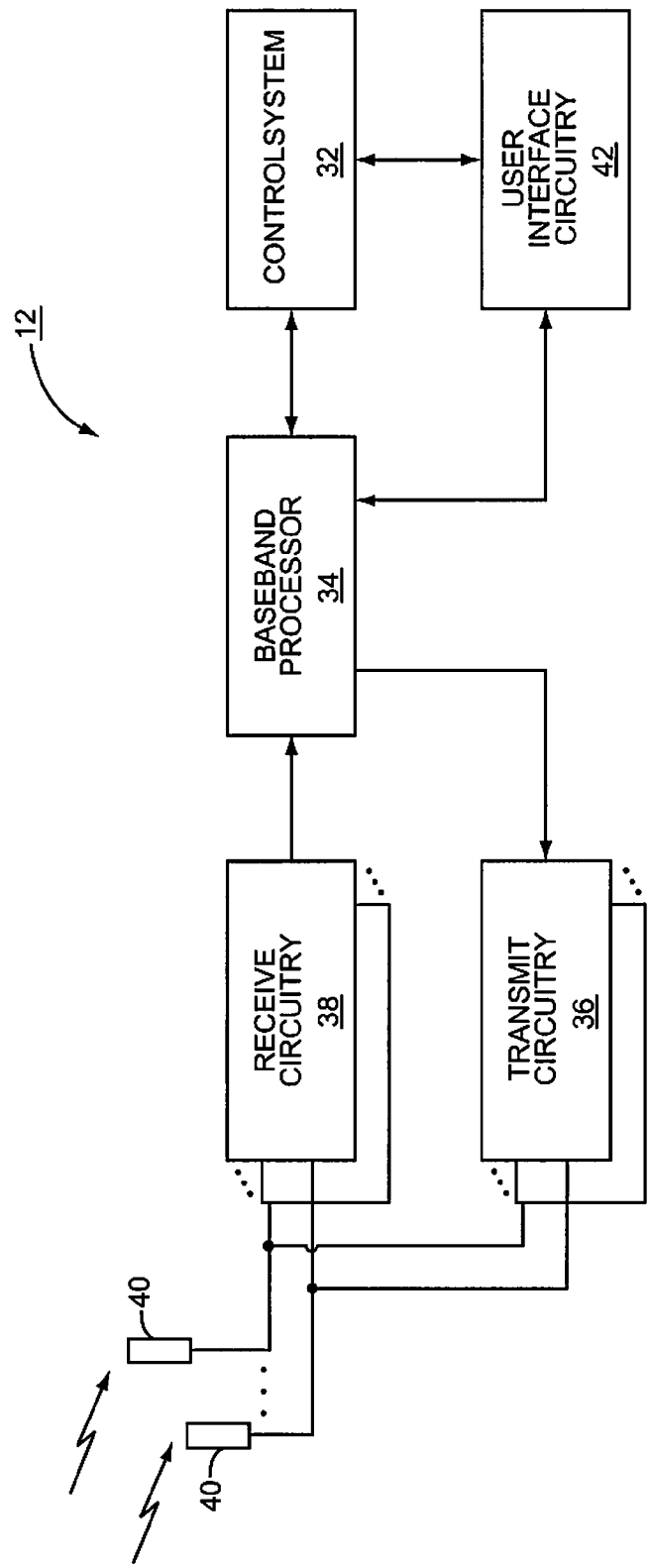
FIG. 12 is a block representation of a mobile terminal according to one embodiment of the present invention.

With reference to FIG. 12, a mobile terminal 12 configured according to one embodiment of the present invention is illustrated. Similarly to the base station 14, the mobile terminal 12 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 13:
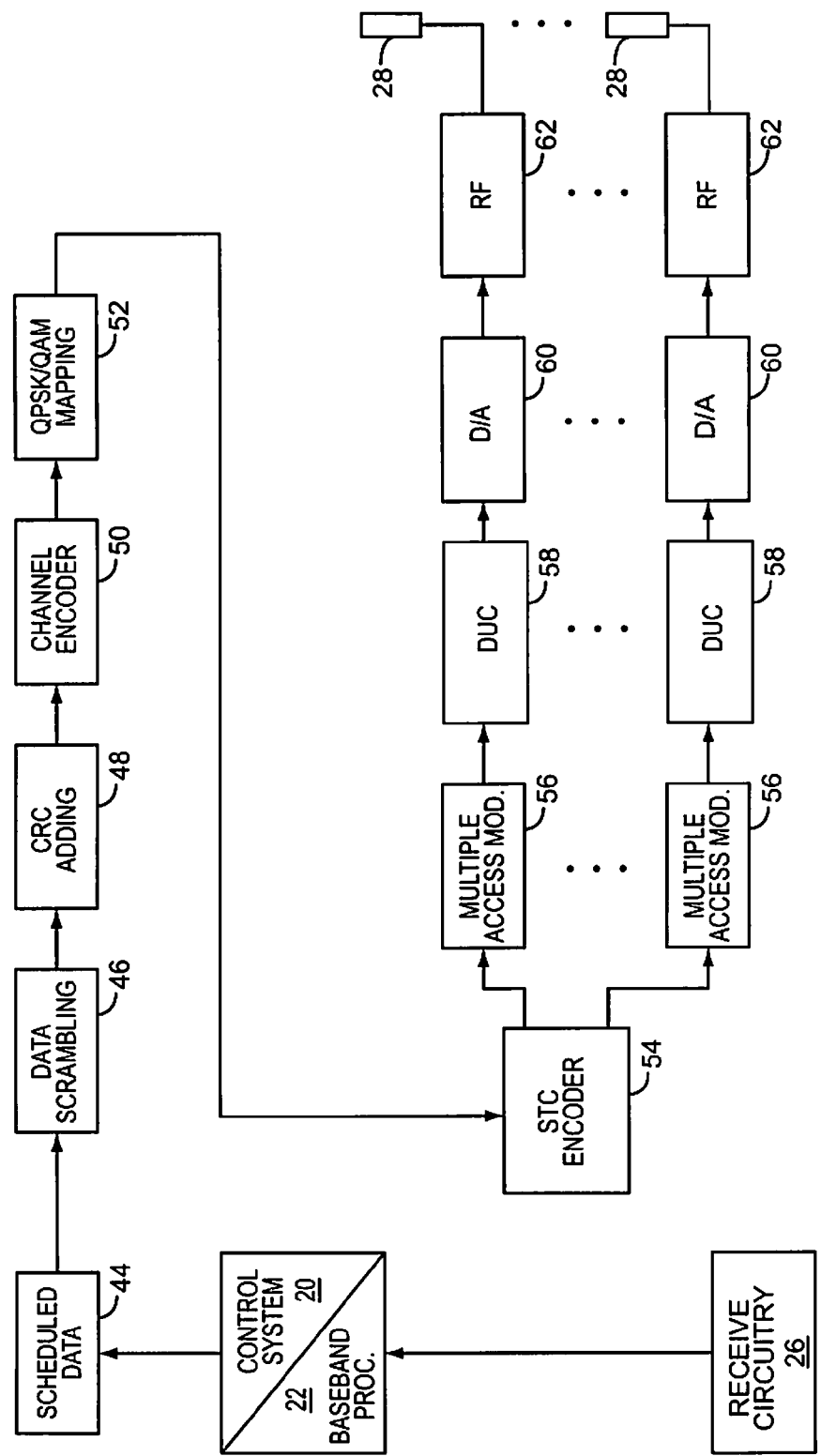
FIG. 13 is a logical breakdown of a transmitter architecture according to one embodiment of the present invention.

With reference to FIG. 13, a logical transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the central network controller 16 sends data (SDUs) intended for a mobile terminal 12 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 12. The channel encoder logic 50 uses known Turbo encoding techniques in one embodiment.

The resultant data bits are systematically mapped into corresponding symbols depending on the chosen baseband modulation by mapping logic 52. Preferably, a form of Quadrature Amplitude Modulation (QAM) or Quadrature Phase Shift Key (QPSK) modulation is used. At this point, groups of bits have been mapped into symbols representing locations in an amplitude and phase constellation. Blocks of symbols are then processed by space-time code (STC) encoder logic 54. The STC encoder logic 54 will process the incoming symbols according to a selected STC encoding mode and provide N outputs corresponding to the number of transmit antennas 28 for the base station 14. At this point, assume the symbols for the N outputs are representative of the data to be transmitted and capable of being recovered by the mobile terminal 12. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998; R. van Nee, A. van Zelst and G. A. Atwater, "Maximum Likelihood Decoding in a Space Division Multiplex System", IEEE VTC. 2000, pp. 6-10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has two antennas 28 (N=2) and the STC encoder logic 54 provides two output streams of symbols. Accordingly, each of the symbol streams output by the STC encoder logic 54 is sent to a corresponding multiple access modulation function 56, illustrated separately for ease of understanding. Those skilled in the art will recognize that one or more processors may be used to provide such analog or digital signal processing alone or in combination with other processing described herein. For example, the multiple access modulation function 56 in a CDMA function would provide the requisite PN code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDM details, and to RF Microelectronics by Behzad Razavi, 1998 for CDMA and other multiple access technologies, both of which are incorporated herein by reference in their entireties.

Each of the resultant signals is up-converted in the digital domain to an intermediate frequency and converted to an analog signal via the corresponding digital up-conversion (DUC) circuitry 58 and digital-to-analog (D/A) conversion circuitry 60. The resultant analog signals are then simultaneously modulated at the desired RF frequency, amplified, and transmitted via RF circuitry 62 and antennas 28. Notably, the transmitted data (PDUs) may be preceded by pilot signals, which are known by the intended mobile terminal 12. The mobile terminal 12, which is discussed in detail below, may use the pilot signals for channel estimation and interference suppression and the header for identification of the base station 14.

Figure 14:
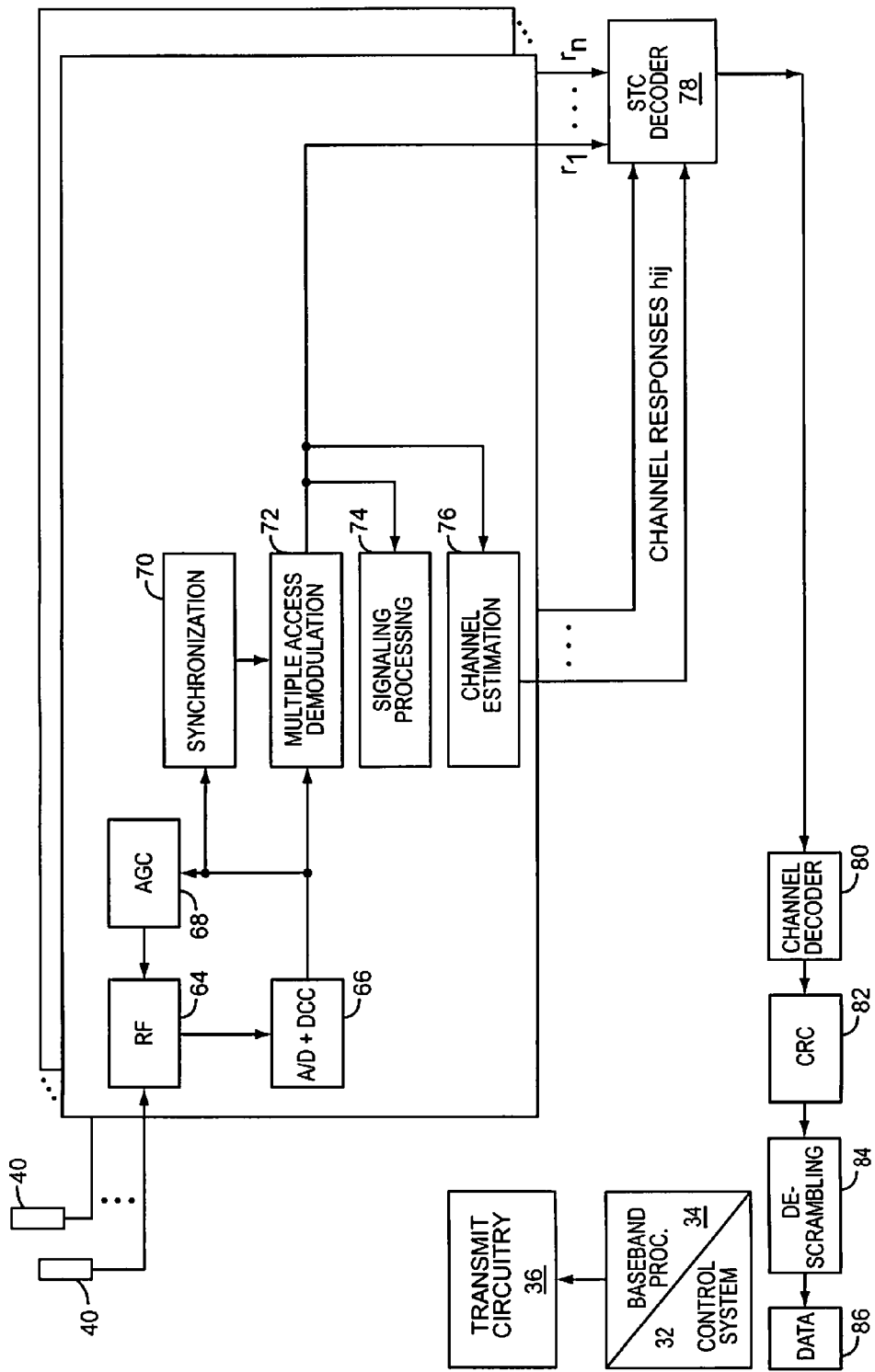
FIG. 14 is a block representation of a receiver architecture according to one embodiment of the present invention.

Reference is now made to FIG. 14 to illustrate reception of the transmitted signals by a mobile terminal 12. Upon arrival of the transmitted signals at each of the antennas 40 of the mobile terminal 12, the respective signals are demodulated and amplified by corresponding RF circuitry 64. For the sake of conciseness and clarity, only one of the multiple receive paths in the receiver is described and illustrated in detail. Analog-to-digital (A/D) conversion and downconversion circuitry (DCC) 66 digitizes and downconverts the analog signal for digital processing. The resultant digitized signal may be used by automatic gain control circuitry (AGC) 68 to control the gain of the amplifiers in the RF circuitry 64 based on the received signal level.

The digitized signal is also fed to synchronization circuitry 70 and a multiple access demodulation function 72, which will recover the incoming signal received at a corresponding antenna 40 at each receiver path. The synchronization circuitry 70 facilitates alignment or correlation of the incoming signal with the multiple access demodulation function 72 to aid recovery of the incoming signal, which is provided to a signaling processing function 74 and channel estimation function 76. The signaling processing function 74 processes basic signaling and header information to provide information sufficient to generate a channel quality measurement, which may bear on an overall signal-to-noise ratio for the link, which takes into account channel conditions and/or signal-to-noise ratios for each receive path.

The channel estimation function 76 for each receive path provides channel responses ($h_{i,j}$) corresponding to channel conditions for use by an STC decoder 78, if so desired or configured. The symbols from the incoming signal and channel estimates for each receive path are provided to the STC decoder 78, which provides STC decoding on each receive path to recover the transmitted symbols. The channel estimates provide sufficient channel response information to allow the STC decoder 78 to decode the symbols according to the STC encoding used by the base station 14 and recover estimates corresponding to the transmitted bits. In a preferred embodiment, the STC decoder 78 implements Maximum Likelihood Decoding (MLD) for BLAST-based transmissions. As such, the outputs of the STC decoder 78 are log likelihood ratios (LLRs) for each of the transmitted bits, as will be described below in greater detail. These estimates, such as the LLRs, are then presented to channel decoder logic 80 to recover the initially scrambled data and the CRC checksum. The channel decoder logic 80 will preferably use Turbo decoding. Accordingly, CRC logic 82 removes the CRC checksum, checks the scrambled data in traditional fashion, and provides it to the de-scrambling logic 84 for de-scrambling using the known base station de-scrambling code to recover the originally transmitted data 86.

Those skilled in the art will recognize improvements and modifications to the preferred embodiments of the present invention. All such improvements and modifications are considered within the scope of the concepts disclosed herein and the claims that follow.

What is claimed is:

1. A method for facilitating a handoff for a mobile terminal in a wireless access network capable of supporting a plurality of different handoff types, the method comprising:
   determining context information associated with supporting wireless communications between the wireless access network and the mobile terminal; and
   selecting a handoff type from the plurality of handoff types based on whether the context information is shared between base stations involved in a handoff or transferred from one base station to another of the base stations involved in the handoff, wherein the selecting a handoff type is performed by at least one of a group comprising the mobile terminal, one of the base stations involved in the handoff, the wireless access network, or a central network controller.

2. The method of claim 1 wherein at least one of the plurality of handoff types is fast base station switching.

3. The method of claim 1 wherein at least one of the plurality of handoff types is soft handoff.

4. The method of claim 3 wherein the soft handoff is macro-diversity soft handoff.

5. The method of claim 3 wherein the soft handoff is selective soft handoff.

6. The method of claim 1 wherein at least two of the plurality of handoff types are fast base station switching and soft handoff.

7. The method of claim 1 wherein the context information is associated with a plurality of levels, and selecting a handoff is further based on a level associated with the context information.

8. The method of claim 7 wherein the level associated with the context information corresponds to service-related information for a communication session.

9. The method of claim 7 wherein the level associated with the context information corresponds to layer 2 processing related information provided at the base stations involved in the handoff.

10. The method of claim 7 wherein the plurality of levels comprises four levels, each of the four levels representing different levels of information associated with wireless communications.

11. The method of claim 1 wherein selecting a handoff is further based on the content of the context information.

12. The method of claim 1 wherein selecting a handoff is further based on an application associated with a communication session.

13. The method of claim 1 wherein selecting a handoff is further based on channel conditions.

14. The method of claim 1 further comprising determining if one or more of the base stations involved in the handoff supports the plurality of handoff types.

15. The method of claim 1 further comprising determining if the mobile terminal supports the plurality of handoff types.

16. The method of claim 1 wherein when the context information is not shared or transferred, the method further comprising selecting a hard handoff.

17. The method of claim 1 wherein when either the mobile terminal or the base stations involved in the handoff do not support one of the plurality of handoff types, the method further comprising selecting a hard handoff.

18. The method of claim 1 wherein one of the base stations involved in the handoff selects the handoff type.

19. The method of claim 1 wherein the mobile terminal selects the handoff type.

20. An apparatus for facilitating a handoff for a mobile terminal in a wireless access network capable of supporting a plurality of different handoff types, the apparatus comprising:
   at least one communication interface; and
   a control system associated with the at least one communication interface adapted to:
      determine context information associated with supporting wireless communications between the wireless access network and the mobile terminal; and
      select a handoff type from the plurality of handoff types based on whether the context information is shared between base stations involved in a handoff or transferred from one base station to another of the base stations involved in the handoff.

* * * * *